(12) United States Patent
Cole

(10) Patent No.: US 7,080,372 B1
(45) Date of Patent: *Jul. 18, 2006

(54) SYSTEM AND METHOD FOR MANAGING SYSTEM CONFIGURATION ACROSS A NETWORK

(75) Inventor: Gary L. Cole, Endicott, NY (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 1139 days.

This patent is subject to a terminal disclaimer.

(21) Appl. No.: 09/591,714

(22) Filed: Jun. 12, 2000

Related U.S. Application Data

(63) Continuation-in-part of application No. 08/814,771, filed on Mar. 7, 1997, now Pat. No. 6,074,434, which is a continuation-in-part of application No. 08/659,841, filed on Jun. 7, 1996, now Pat. No. 5,752,042.

(51) Int. Cl.
*G06F 9/44* (2006.01)

(52) U.S. Cl. .................. 717/173; 717/178; 707/203; 709/219; 709/221

(58) Field of Classification Search ......... 717/168–178; 709/220, 221, 223, 224, 232, 219; 707/203
See application file for complete search history.

(56) References Cited

U.S. PATENT DOCUMENTS

| | | | |
|---|---|---|---|
| 4,558,413 A | 12/1985 | Schmidt et al. | 707/203 |
| 4,714,995 A | 12/1987 | Materna et al. | 707/201 |
| 5,005,122 A | 4/1991 | Griffin et al. | 709/203 |
| 5,019,963 A | 5/1991 | Alderson et al. | 707/201 |
| 5,133,075 A | 7/1992 | Risch | 707/201 |
| 5,155,847 A | 10/1992 | Kirouac et al. | 709/221 |
| 5,249,290 A | 9/1993 | Heizer | 718/105 |

(Continued)

FOREIGN PATENT DOCUMENTS

| | | |
|---|---|---|
| JP | 20280 | 1/1993 |
| JP | 129407 | 5/1995 |
| JP | 175641 | 7/1995 |
| JP | 225724 | 8/1995 |
| JP | 7295830 | 11/1995 |

OTHER PUBLICATIONS

Product Briefing: Cybermedia Oil Change Software: How it works, PR Newswire May 1996) V2.5, Product Description [online], McAfee, 1999.

(Continued)

*Primary Examiner*—Hoang-Vu "Antony" Nguyen-Ba
(74) *Attorney, Agent, or Firm*—Lawrence Ashery

(57) ABSTRACT

A system and method are provided for determining whether to provide a software program update to one of a plurality of client processors. Each client processor has a copy of at least one of a plurality of client software programs. A respective set of system configuration attributes are sent from each client processor and stored in an administration server processor. Each set of system configuration attributes is transmitted to a selection server processor. A respective update recognizer program and software program update corresponding to each respective one of the plurality of client software programs are next sent to the administration server processor. Each client processor executes at least one of the update recognizer programs to issue a notification indicating whether the corresponding software program update is applicable. The administration server processor receives the respective notification from each client processor and transmits the software program update.

15 Claims, 16 Drawing Sheets

U.S. PATENT DOCUMENTS

| | | | |
|---|---|---|---|
| 5,339,430 A | 8/1994 | Lundin et al. | 719/332 |
| 5,341,477 A | 8/1994 | Pitkin et al. | 709/226 |
| 5,452,448 A | 9/1995 | Sakuraba et al. | 707/201 |
| 5,473,772 A | 12/1995 | Halliwell et al. | 717/171 |
| 5,491,820 A | 2/1996 | Belove et al. | 707/3 |
| 5,495,610 A | 2/1996 | Shing et al. | 709/221 |
| 5,553,282 A | 9/1996 | Parrish et al. | 707/10 |
| 5,579,222 A | 11/1996 | Bains et al. | 717/167 |
| 5,581,764 A | 12/1996 | Fitzgerald et al. | 709/223 |
| 5,596,723 A * | 1/1997 | Romohr | 709/222 |
| 5,619,716 A * | 4/1997 | Nonaka et al. | 717/167 |
| 5,644,720 A | 7/1997 | Boll et al. | 709/227 |
| 5,734,831 A * | 3/1998 | Sanders | 709/223 |
| 5,742,829 A | 4/1998 | Davis et al. | 717/178 |
| 5,752,042 A | 5/1998 | Cole et al. | 717/173 |
| 5,845,077 A | 12/1998 | Fawcett | 709/221 |
| 6,110,228 A * | 8/2000 | Albright et al. | 717/178 |

OTHER PUBLICATIONS

IBM Technical Disclosure Bulletin, vol. 38, No. 12, 12–95, p.479, "Disk Drive with Embedded hyper–Text Markukp Language Server".

Copies of "Surfin' Service"transparency foils, Jul. 1997.

D. Dobrenic, "system for Centralized Managemetn of Remote Hosts with Different Operating Systems." conference –ITI '96 Proceedings of the 18th International Conference on Information Technology, Interfaces, Pula, Croatia, 18–21 Jun. 1996 (Abstract).

McAfee.com Clinic McAfee.com, Inc. 535 Oakmead Parkway, Sunnyvale, CA 94085.

Cybermedia Oil Change 2.5 by: Ash Nallawalla p. 1–3. Date unknown.

Cybermedia Oil Change Version 2.5 pp. 1–9. Date unknown.

18th Int. Conf. Information Technology Interface ITI'96, Jun. 18–21, 1996, Pula, Croatia "System for Centralized Management of Remote Hosts with Differenct Operating Systems."

* cited by examiner

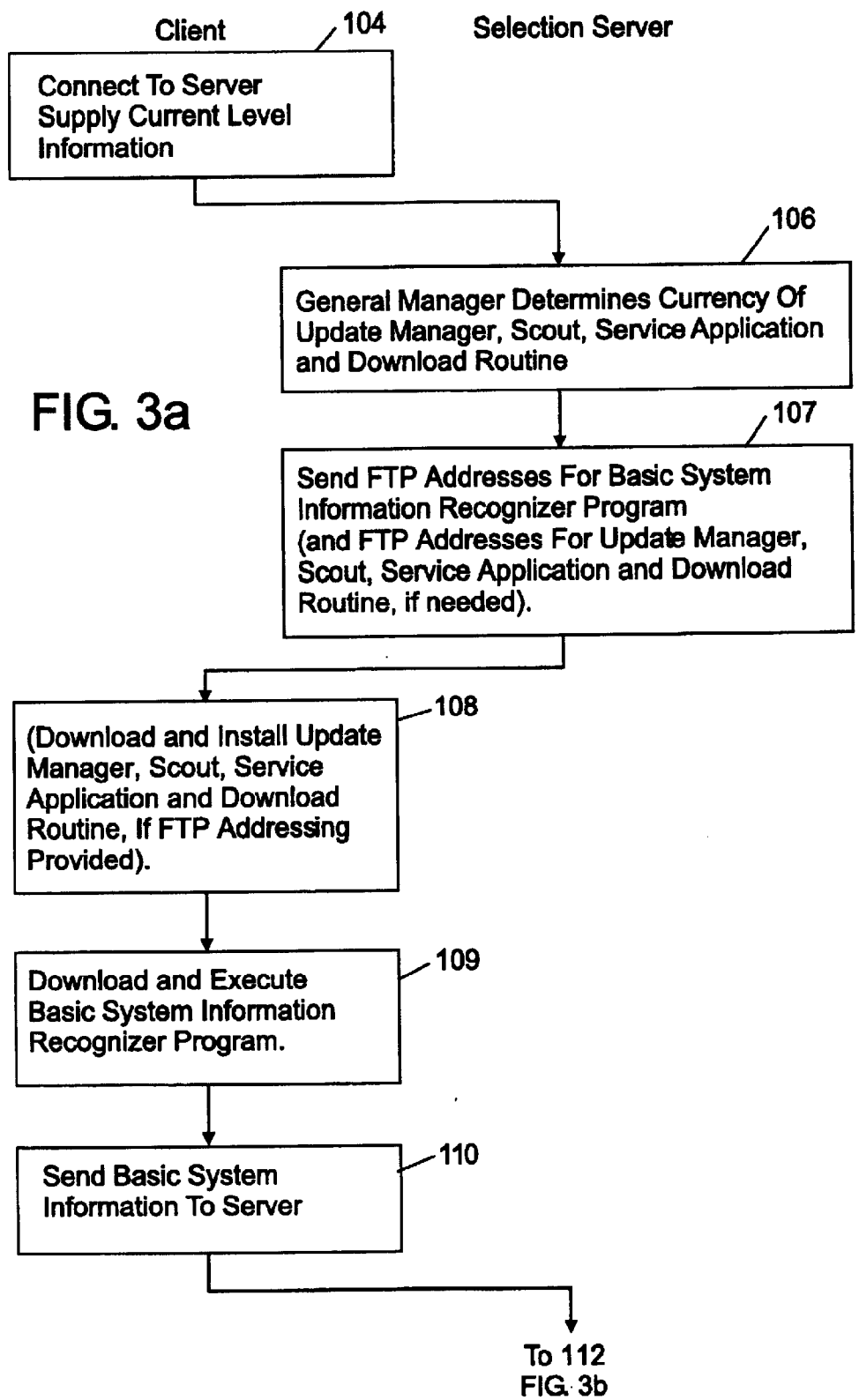

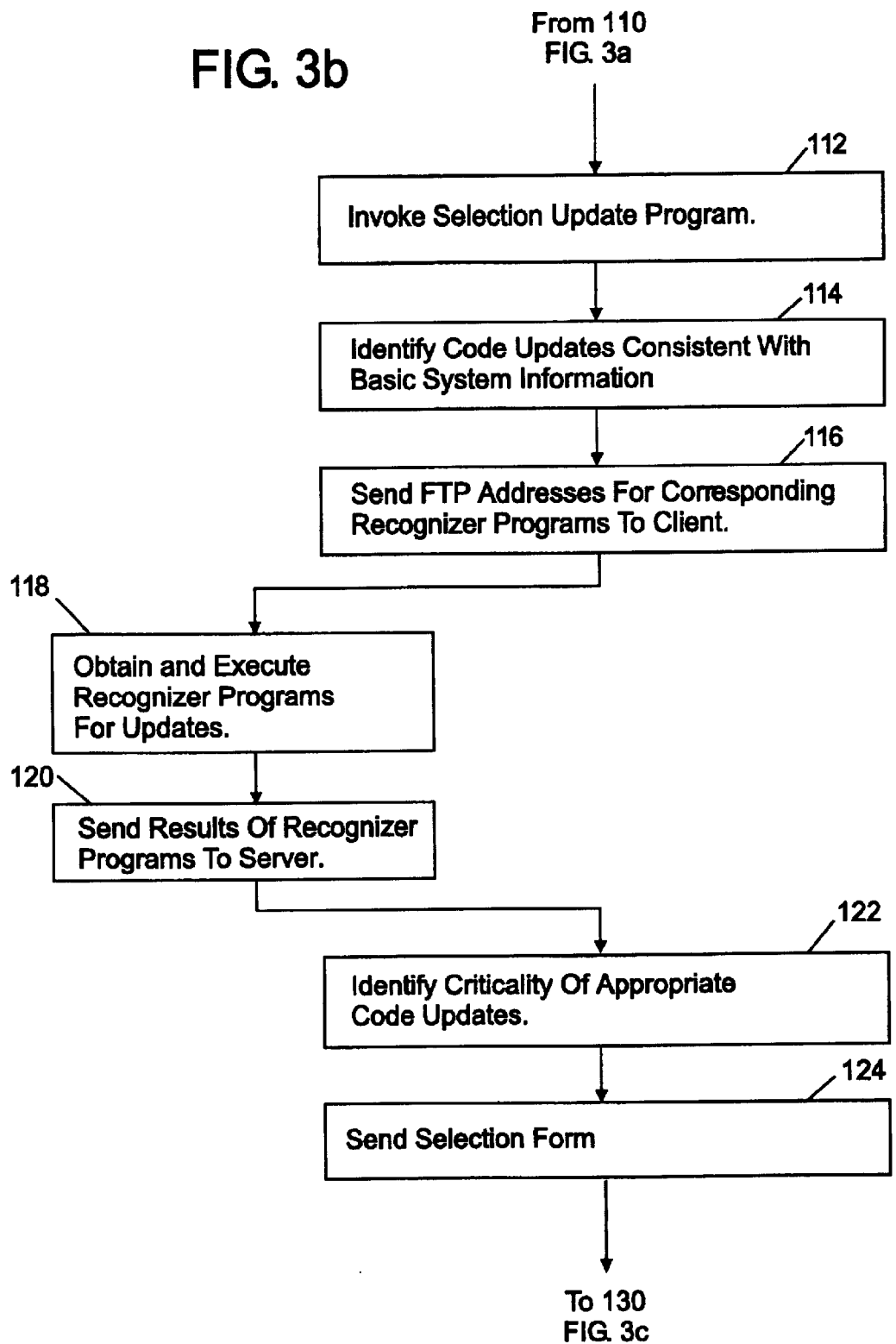

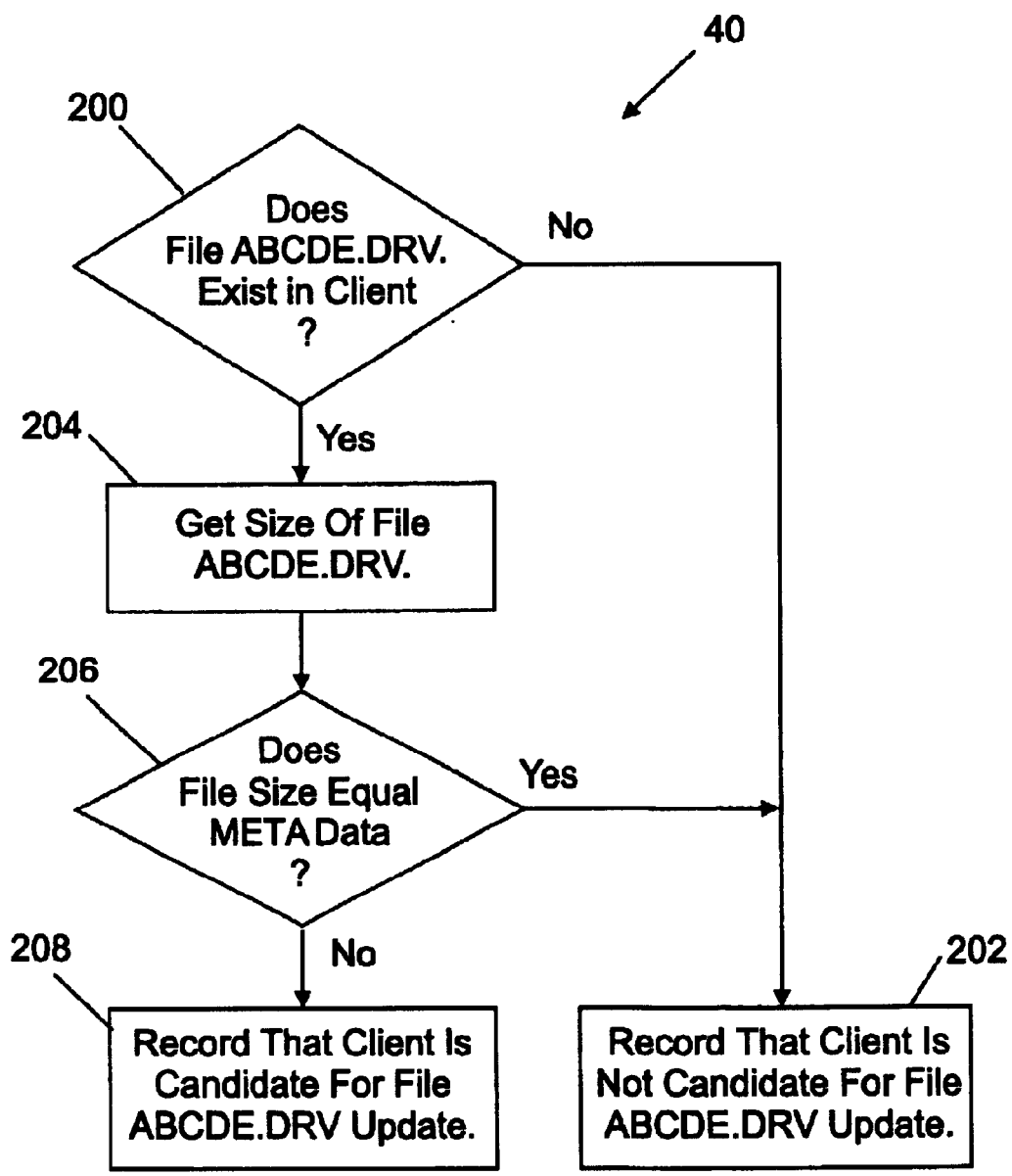

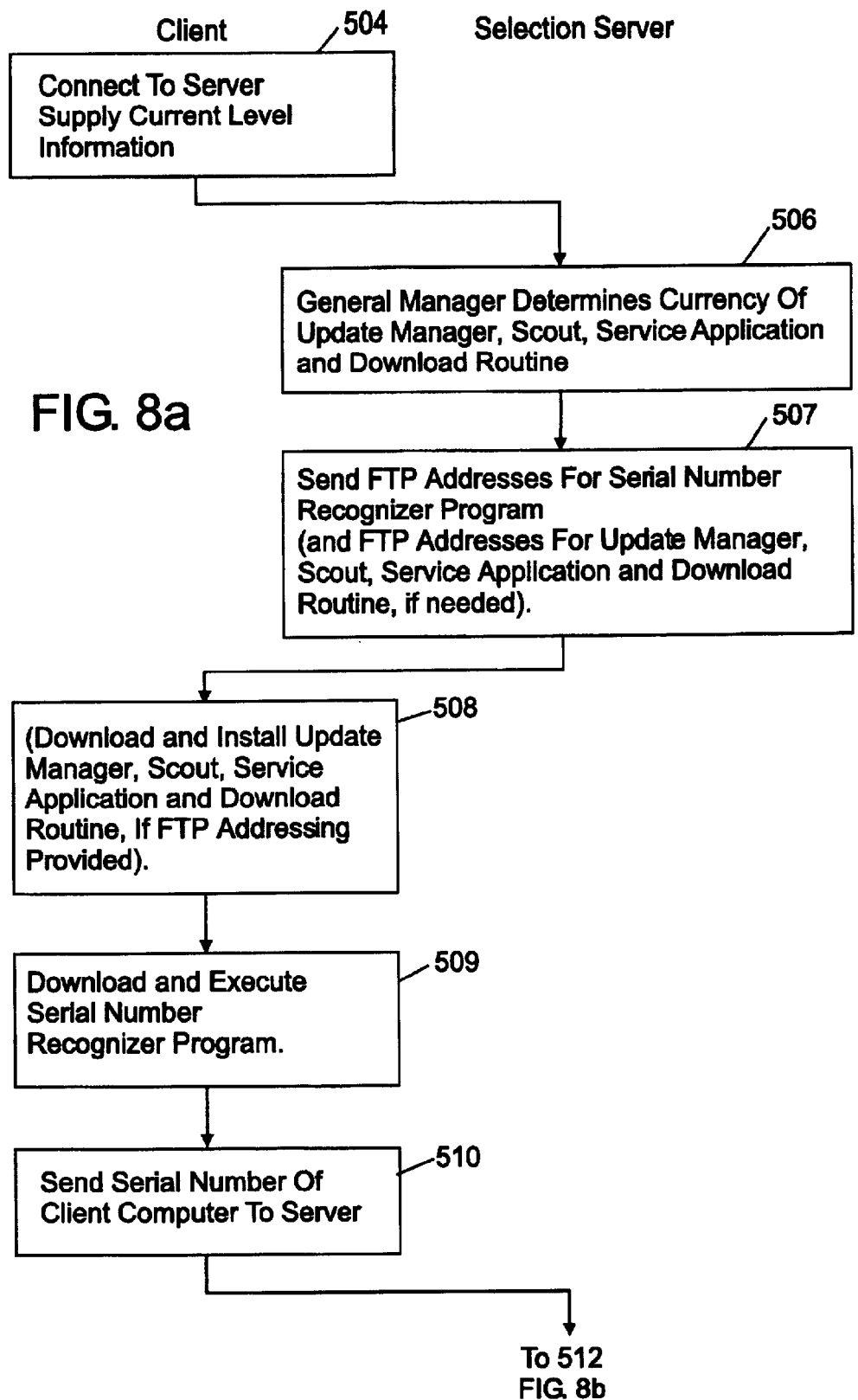

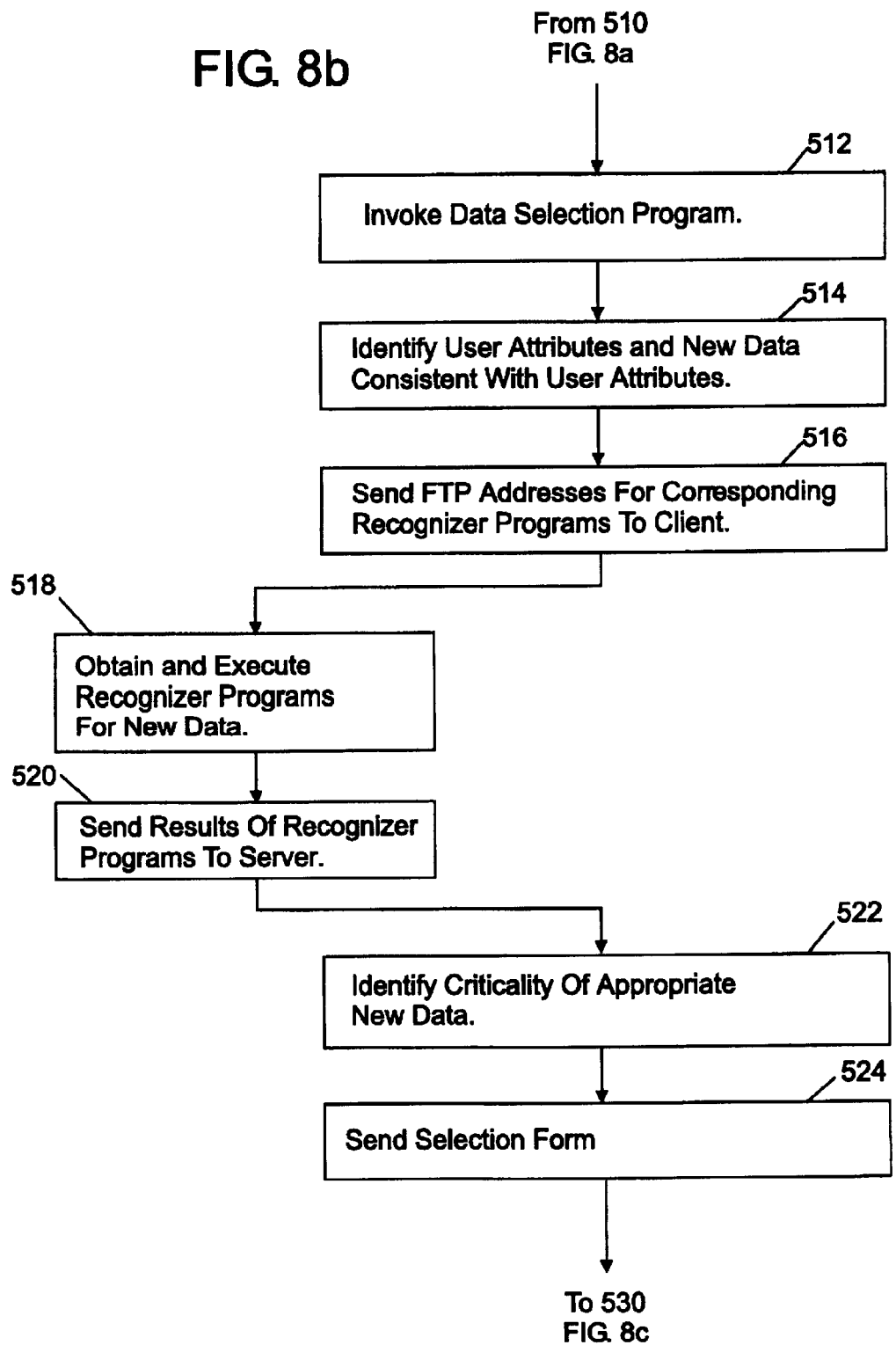

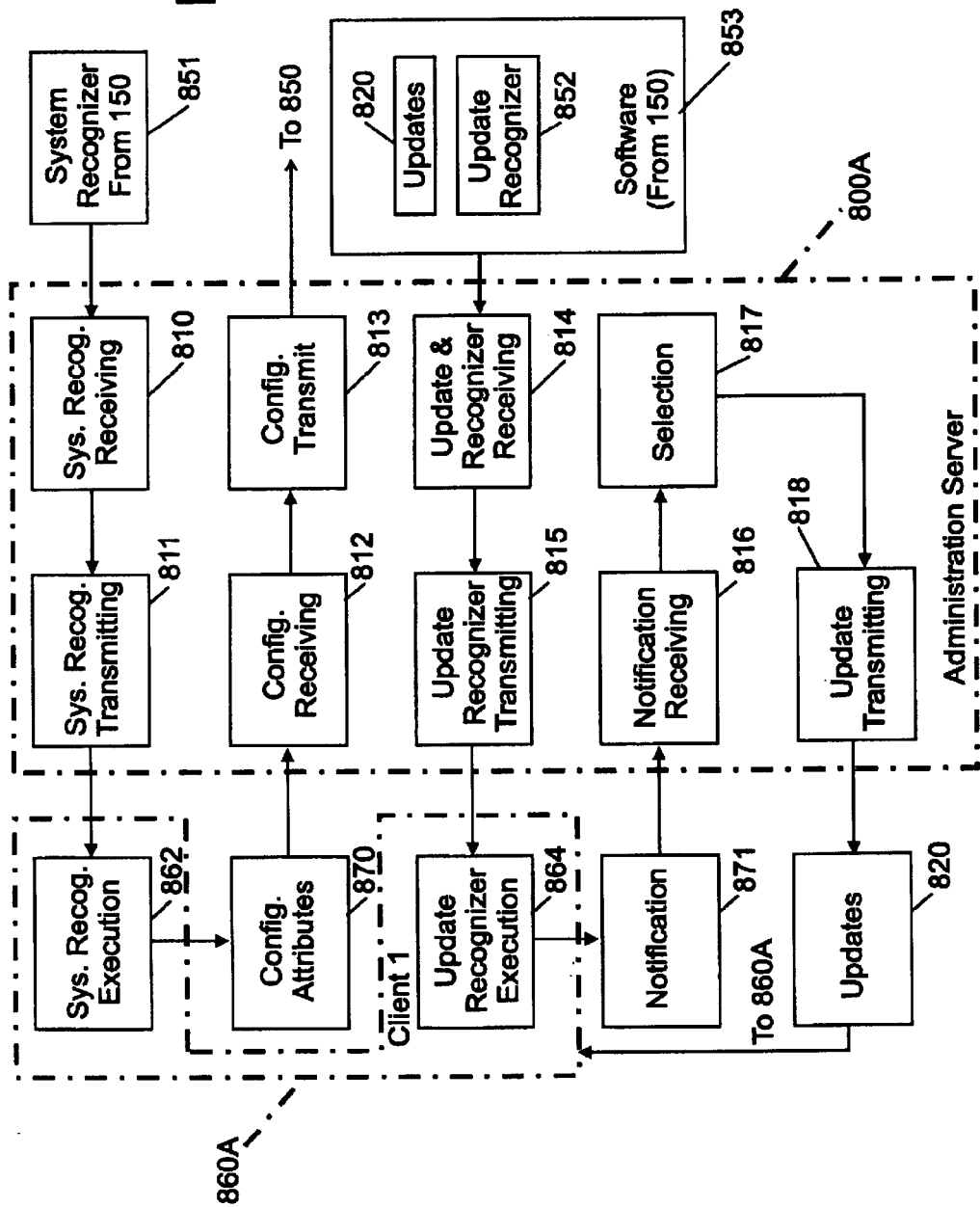

SYSTEM AND METHOD FOR MANAGING SYSTEM CONFIGURATION ACROSS A NETWORK

RELATED APPLICATION

This application is a continuation-in-part claiming the benefit of U.S. patent application Ser. No. 08/814,771, filed on Mar. 7, 1997 and to be issued as U.S. Pat. No. 6,074,434, which is itself a continuation-in-part of U.S. patent application Ser. No. 08/659,841, filed on Jun. 7, 1996, and issued as U.S. Pat. No. 5,752,042.

FIELD OF THE INVENTION

The present invention relates generally to computer systems and, more specifically, to system configuration management for a plurality of computers connected via a network.

BACKGROUND OF THE INVENTION

The use of the client-server distributed computing model in local area networks and enterprise-wide systems has become ubiquitous in business, academic, and personal computing environments. With increasing frequency, fixed function display terminals have been replaced by desktop and laptop computers capable of executing software programs independently and asynchronously from the centralized mainframe or enterprise server processor.

As the number of desktop and laptop computers in a local (or enterprise-wide) network increases, the complexity of maintaining the software configuration in each computer increases. Software developers frequently distribute updated versions or releases of their software products, referred to as "updates" in this document, to correct software errors or to enhance functionality, compatibility, and portability. Of course, software developers also distribute new software products designed to improve performance, typically with an increase in the complexity of installing and configuring such new software products.

There are various known techniques for a server to provide a client with a code update or a user with new data. In one technique, clients register with the server for updates to a particular program and users register with the server for updates or new data. Whenever the server obtains a new update for that program or new data of the specified type, the server automatically sends the code update or new data of the specified type to every client/user on the list. Unfortunately, some users may not wish to obtain a particular update or particular new data of the specified type because of cost, download time, or other reason. Alternately, a user can periodically request all code updates or new data of specified types and the server will respond accordingly. Unfortunately again, the user may not need every code update or data of the specified type but, nevertheless, endures the cost and download time. In general, because of the large number and complexity of software applications on a user's system, and the large number and complexity of the corresponding updates for that system, it is very difficult for users to know what updates are appropriate for them. Likewise, there is so much new data generated every day that it is difficult to know what new data is appropriate for particular users.

Thus, network operators have been faced with the challenge of balancing their desire to provide their clients with the most current software updates and products against their requirement of minimizing disruptions to the clients. Software configuration management tools have been developed to assist network operators in this endeavor.

U.S. Pat. No. 5,752,042 issued to Cole et al. discloses a server computer and a method performed by a server computer for selecting code updates to download to a client computer. The server computer identifies code updates which are consistent with basic system characteristics of the client computer. Then, the server computer sends to the client a "recognizer" program which executes in the client computer to determine if the client computer has a version of code that is not current. The server may then generate a list of code updates based upon the result of executing the recognizer program. A user at the client computer end can select from the list. Based on the selections made by the user, the server computer sends addresses of the selected code updates to the client computer. The client computer may then download the selected updates from a server computer.

U.S. Pat. No. 5,581,764 issued to Fitzgerald et al. discloses an automated method of managing changes in a distributed computing environment. The resource needs of individual distributed computers are determined based upon a Should Have (SH) list schema. The SH list schema is used to produce SH lists for individual distributed computers. Individual Already Have (AH) lists may be stored or produced at configuration time for individual distributed computers. A differencing process is used to locate differences between SH lists and AH lists. The differences between SH lists and AH lists for the individual distributed computers are used to determine what items must be updated or modified in order to update individual desktops.

In prior art configuration management systems, information describing the software configuration attributes of each client processor was provided to a central server processor. The central server processor would determine which updates and new products to provide to each client, based on the software configuration of each client.

There remains a need, therefore, for a more flexible and robust software and hardware configuration management system.

SUMMARY OF THE INVENTION

To meet this and other needs, and in view of its purposes, the present invention provides a system and method for determining whether to provide a software program update to a client processor. A configuration receiving mechanism receives and stores a set of hardware, software, or both hardware and software (or "system") configuration attributes from the client processor. The system configuration attributes indicate whether a copy of a client software program may be stored in the client processor. A configuration transmitting mechanism transmits the set of system configuration attributes to a server processor. An update-receiving mechanism receives an update recognizer program and a software program update from the server processor.

The update recognizer program and the software program update are associated with the client software program. An update recognizer transmitting mechanism transmits the update recognizer program to the client processor. The client processor executes the update recognizer program to issue a notification indicating whether the software program update is applicable to the copy of the client software program which may be stored in the client processor.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 4 is a flow chart illustrating a program sent from the server to the client of FIG. 2 to determine needs of the client for a particular code update;

FIG. 12 is a block diagram of the exemplary administration server shown in FIG. 11.

DETAILED DESCRIPTION OF THE INVENTION

Figure 1:
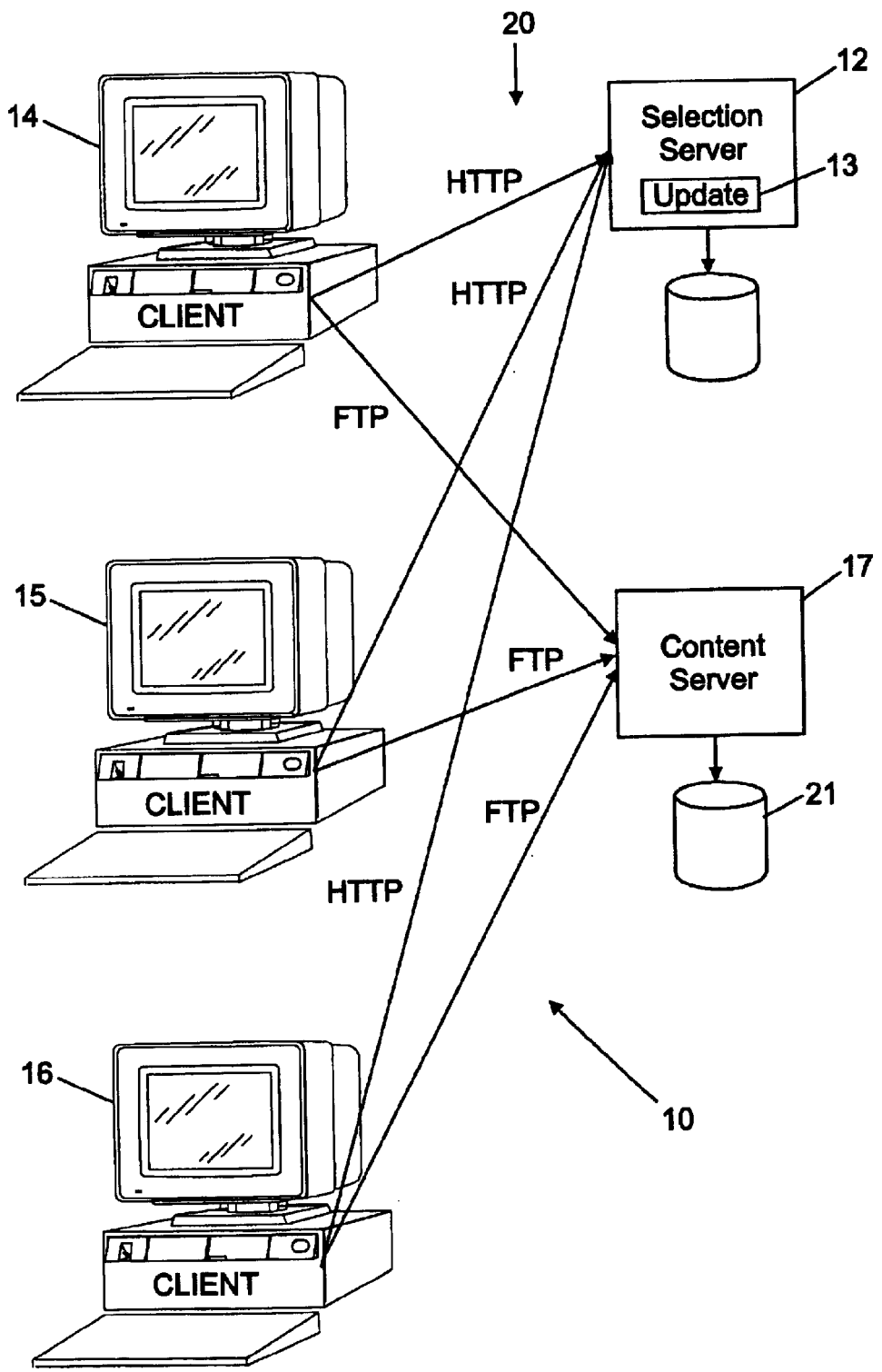
FIG. 1 illustrates a computer network including clients, a selection server, and a content server.

Referring now to the figures in detail, in which like reference numbers indicate like elements throughout, FIG. 1 illustrates a computer network generally designated 10 including clients, a selection server, and a content server. Network 10 comprises a selection server 12 with a data base 13, a content server 17, clients 14–16, and an Internet 20 to interconnect the servers and clients. By way of example, the selection server 12 comprises a computer workstation with associated programming and a modem, the content server 17 comprises a computer workstation with associated programming and a modem, and each of the clients 14–16 comprises a personal computer with associated programming and a modem. The Internet 20 comprises a communication medium such as telephone wires between the clients 14–16, the selection server 12, and the content server 17 and programming to manage the communications.

Communications between the clients 14–16 and the selection server 12 use hypertext transport protocol (HTTP) and communications between the clients 14–16 and the content server 17 use file transport protocol (FTP). Although not shown, there are many other servers for the Internet. Selection server 12 is dedicated to automating selection of code updates, the content server 17 includes the actual code updates (stored on disk 21), and data base 13 includes meta data for the code updates and FTP addressing information to locate the code updates in content server 17. The meta data provides descriptive information about the respective code updates such as basic input output system (BIOS) level, pre-load level, motherboard ID, and the like. The FTP addressing information indicates the address or identification of the content server which stores the respective code update (content server 17 in the illustrated example), a user ID and password to log-on to the content server, a name of the code update, a list of files which comprise the code update and the size, checksum, and directory of each file.

According to one process for storing the updates in the content server 17 and the meta data in the selection server 12, a person writes the code update and meta data and loads them in the content server 17, either via the Internet or by manual loading. The code updates remain stored in the content server, but the meta data is written to the selection server, either via the Internet or by manual loading.

Figure 2:
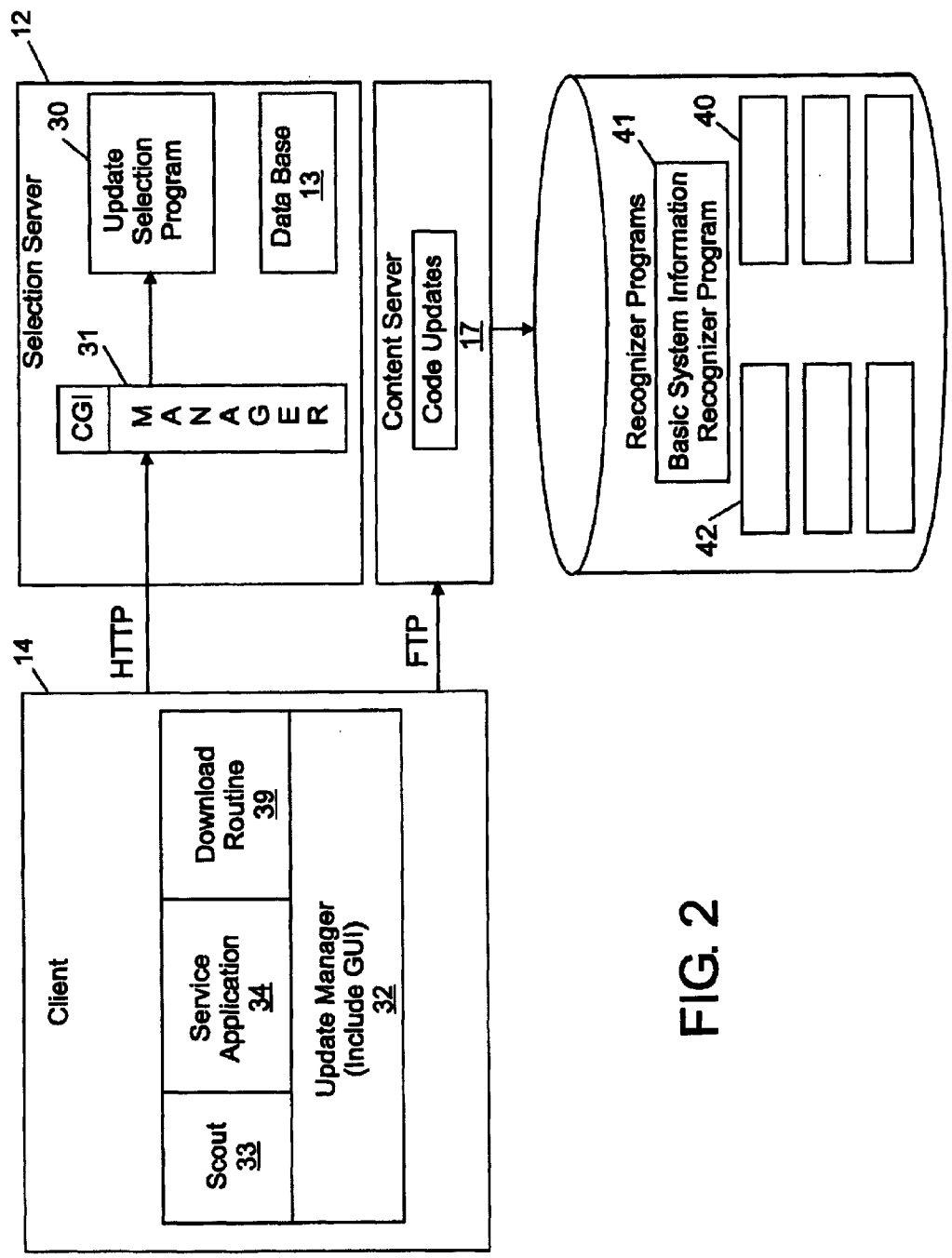
FIG. 2 is a block diagram illustrating more detail of a selection server, content server, and a client in the network of FIG. 1.
Figure 3C:
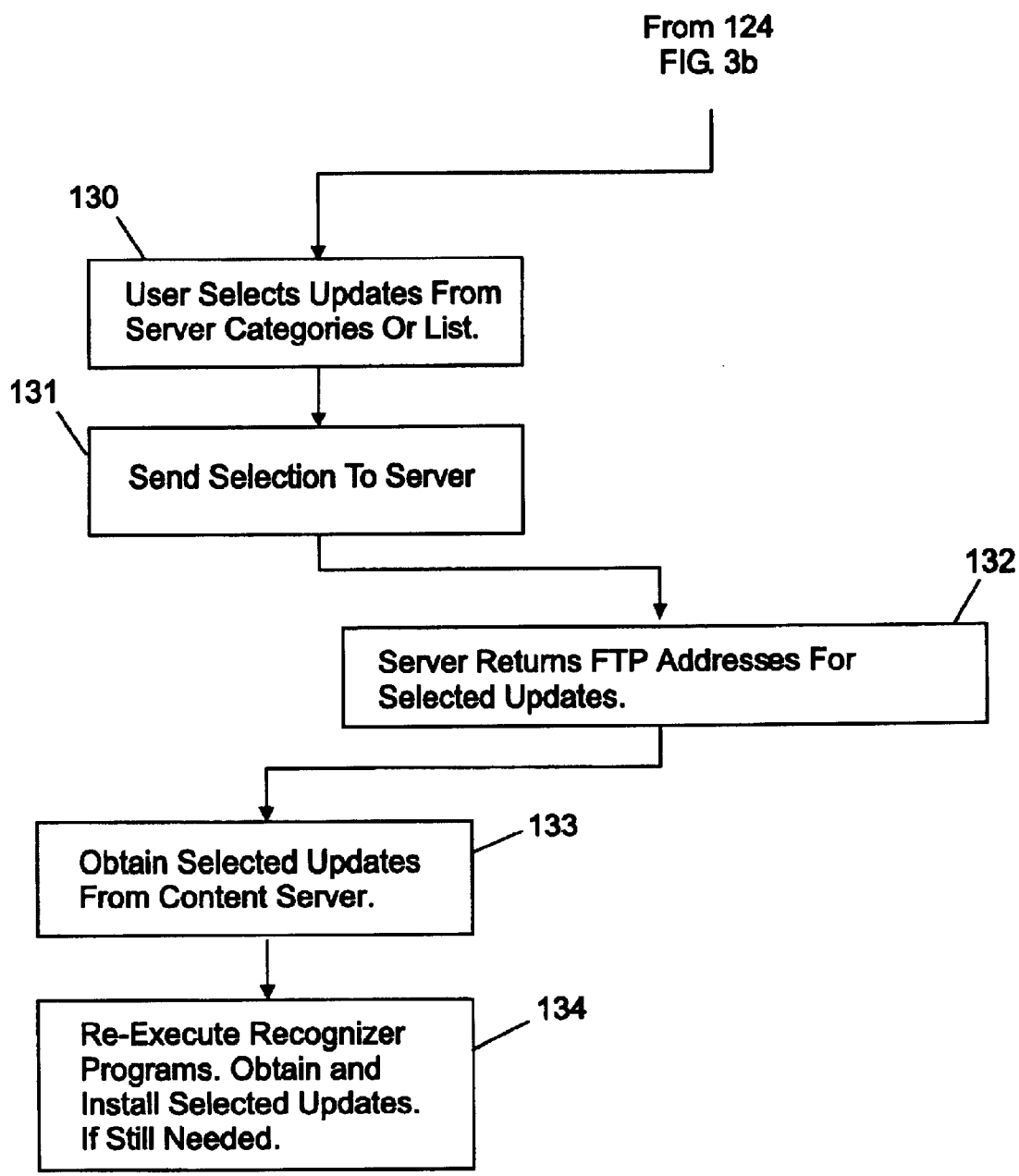
FIGS. 3a and 3b form a flow chart illustrating operation of the client and server of FIG. 2.

As illustrated in FIG. 2, the selection server 12 is an HTTP server with an associated "CGI" program manager 31 and includes an update selection program 30. The client 14 includes an update manager program 32 (including a graphical user interface or "GUI"), a scout routine 33, a service application routine 34, and a download routine 39. The functions of the server and client programming and a typical client-server session for selecting and downloading updates are illustrated in FIGS. 3a and 3b. A user at client computer 14 selects an icon to invoke update manager 32. In response, the update manager contacts the general manager 31 in server 12 to begin a session and supplies the current level of update manager 32, scout 33, service application 34, and download routine 39 within client 14 (step 104). In response, the general manager 31 determines if the client's update manager 32, scout 33, service application 34, and download routine 39 are the latest version (step 106). This determination is performed by comparing the client level information supplied by the client 14 to the data in selection server 12 for the latest version of the client's update manager 32, scout 33, service application 34, and download routine 39 stored in the content server 17.

If the client's update manager 32, scout 33, service application 34, and download routine 39 are not the latest version, the server 12 sends the FTP addressing information to the client 14 to allow the client to retrieve the latest versions from a content server 17. Along with the FTP addressing for the client update manager, scout, service application, and download routine, the server 12 sends FTP addressing information to the client 14 for a basic system information recognizer program 41 stored in content server 17 (step 107). Next, the client 14 downloads and installs the latest version of the client update manager 32, scout 33, service application 34, and download routine 39 from the content server 17 if the FTP addressing was provided (step 108).

The furnishing of the FTP addressing information for the basic system information recognizer program begins the selection process. The client 14 next downloads the basic system information recognizer program 41 from the content server 17 and executes it (step 109). The basic system information recognizer program 41 then obtains basic system information, using scout APIs, about client 14 (step 109). The basic system information comprises system model, pre-load software level, BIOS level, and information that is not likely to change often such as type of operating system. For example, the basic system information of client 14 is BIOS level 123, BIOS date Jan. 1, 1996, and mother board ID XYZ. The update manager 32 then sends the basic system information, obtained by the basic system information recognizer program 41, to the selection server 12 (step 110).

This initiates the selection update program 30 (step 112). The selection update program 30 within server 12 then determines which code updates are consistent with the basic system information of the client and which code updates are inconsistent, thereby eliminating the vast majority of the code updates stored in content server 17 (and other content servers, if any) from further consideration (step 114). In the illustrated embodiment, this determination is made by correlating the meta data in data base 13 to the basic system information obtained from client 14. Matches between the meta data and the basic system information indicate that the corresponding code updates are potentially appropriate for client 14. (In practice, the meta data can be arranged in a relational data base to facilitate the correlation.) The two columns of the following table list code updates available in content server 17 and the meta data for these code updates. The two columns of this table are used for the initial correlation of the basic system information obtained from client 14 to the meta data (column 2) stored in selection server 12.

| Code Updates | Basic System Information/Meta Data |
| --- | --- |
| Device Driver ABCDE.DRV | BIOS Level 123 BIOS date 1/1/96 Mother Board ID XYZ |
| Netcomber 2.0 | BIOS Level 123 BIOS date 1/1/96 Mother Board ID XYZ |
| Device Driver FGHIJ.DRV | BIOS Level 456 BIOS date 2/1/96 Mother Board ID XYZ |

In this example, the BIOS level 123, BIOS date Jan. 1, 1996, and mother board ID XYZ basic system information obtained from client 14 is consistent with a device driver file named ABCDE.DRV. and Netcomber (trademark of International Business Machines Corporation) version 2.0. Device driver file named FGHIJ.DRV requires BIOS level 456, however, so is inconsistent with the basic system information obtained from client 14 and is eliminated from further consideration.

For each code update, such as device driver file named ABCDE.DRV and Netcomber program version 2.0, which is consistent with the basic system information of client 14, the selection update program 30 sends to the client 14 the FTP addressing information of a corresponding recognizer program, such as recognizer programs 40 and 42, respectively (step 116). The FTP addressing information is not provided (and no recognizer program is fetched) to client 14 for the device driver file named FGHIJ.DRV, however, because file FGHIJ.DRV is not consistent with the basic system information of client 14. From the FTP addressing information, the client 14 downloads the actual recognizer programs from the content server 17 (step 118).

Each recognizer program is executable and small, typically 2,000–3,000 bytes. Consequently, each recognizer program can be downloaded from content server 17 to the client 14 in seconds (whereas the corresponding code update is much larger and may take hours to download).

It should be noted that, based on the basic system information alone, the update selection program 30 within server 12 is not sure which of the code updates that are consistent with the basic system information are actually needed by the client. For example, the client 14 may already have the latest version.

Next, the client 14 executes each recognizer program 40 and 42 with assistance from the scout 33 (step 118). The scout 33 assists the recognizer programs by providing subroutines that can be called by the recognizer programs. For files required by the recognizer programs, these callable subroutines can locate the files, determine the version of the files, determine the length of the file, identify a directory which lists the files, obtain time stamps for the files, obtain data from inside the files, and obtain data from a program registry. This further reduces the requisite length of each recognizer program and therefore shortens the download time. When executed, each recognizer program further investigates the hardware, software, and other components of the client 14 for information to determine whether the corresponding code update is appropriate for the client 14. For example, this investigation reveals whether the client 14 already has these code updates. A recognizer program could also determine if the corresponding code update is consistent with aspects of the client other than the basic system information, such as other programs within the client.

Recognizer program 40 determines from the routine of scout 33 in client 14 if the size of file ABCDE.DRV. stored by the client 14 is the same as the size of file ABCDE.DRV. stored in the data base 13. If so, then client 14 has the latest update. If not, then client 14 likely has an old version which could be updated.

FIG. 4 illustrates recognizer program 40 in more detail. In step 200, recognizer program 40 calls scout 33 to scan the hard disk of client 14 for file ABCDE.DRV to determine if file ABCDE.DRV exists in client 14. If not, the recognizer program provides an indication that file ABCDE.DRV is not appropriate for client 14 (step 202). If file ABCDE.DRV exists in client 14, however, then recognizer program 40 calls scout 33 to retrieve the size of file ABCDE.DRV in client 14 (step 204), and then compares the file size to the size of the latest version stored in the content server (decision 206). (The recognizer program includes an indication of the size of the corresponding update in the content server.) If the two sizes are the same, then there is no need to download file ABCDE.DRV from the content server 17; client 14 already has the latest version. If the two sizes are not the same, then recognizer program 40 makes a record that the file ABCDE.DRV stored in the content server 17 is appropriate for client 14 (step 208).

Figure 5:
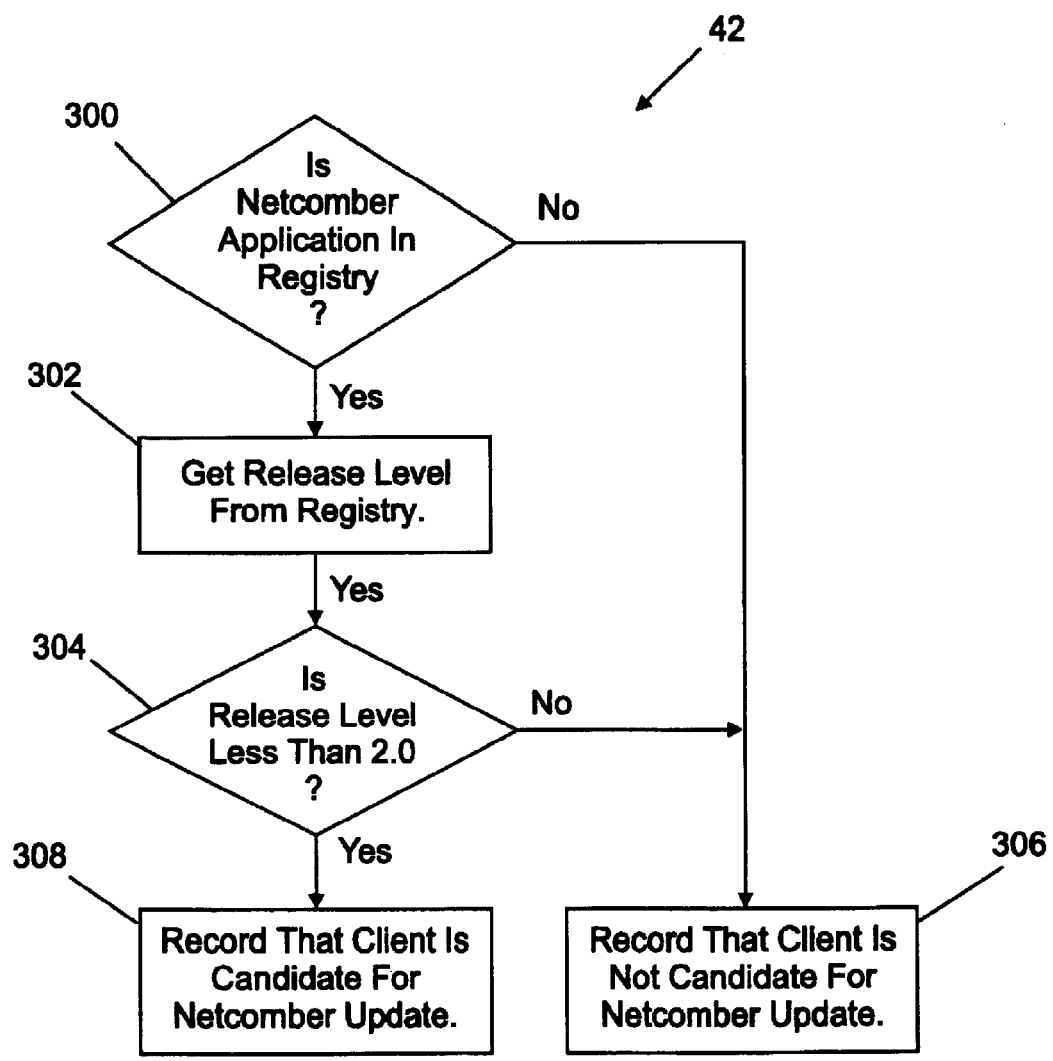
FIG. 5 is another flow chart illustrating a program sent from the server to the client of FIG. 2 to determine needs of the client for another particular code update.

Recognizer program 42 compares a version number of the Netcomber program in the client to the version number of the Netcomber program of the code update, and if the version number of the Netcomber program installed in client 14 is less, then the client likely has an old version. FIG. 5 illustrates recognizer program 42 in more detail. In step 300, recognizer program 42 calls scout 33 to read a data base in client 14 to determine if the Netcomber program exists in client 14. If it does, recognizer program 42 calls scout 33 to obtain the version number of the Netcomber program from the data base (step 302). If the version number stored in the data base is equal to or greater than the version number in the recognizer program, then client 14 does not need the version stored in the content server 17 (decision 304 and step 306). If the version number stored in the data base is less than the version number in the recognizer program, however, then the recognizer program records that client 14 needs the copy of the Netcomber program stored in the content server 17 (decision 304 and step 308).

The results of the recognizer programs include yes/no answers to the question of whether each respective code update is appropriate for the client, i.e. not currently resident in client 14 and consistent with the client basic system information as determined previously (in step 114). The recognizer programs can also assign a "critical" level to each code update based on the need of the client for the update. For example, if another program in the client needs this code update to function, then this code update would be assigned a high level of criticality. After the recognizer programs are executed in client 14, client 14 sends to selection server 12 a list of the code updates which are appropriate for the client (step 120).

Based on the information gathered by the recognizer programs, the update selection program determines the level of criticality of the respective code updates and builds a selection form for display at the client (step 122). The selection form comprises a list of the code updates that are consistent with the basic system information and appropriate for the client 14, and a display of the following three selection choices (step 124):

1. minimum number of code updates—code updates which are necessary for the client to ensure compatibility between programs within the client and fix a significant "bug" in a program within the client, and those other updates that the author of the code update deemed critical such as replacement of unsupported programs;
2. maximum number of code updates—all code updates which are consistent with the basic system information and appropriate for the client; and
3. client selection of specific code updates—user selects particular code updates from the list of all code updates which are consistent with the basic system information and appropriate for the client.

Next, the client makes a selection, either selection of the first or second categories or an itemized list of code updates pursuant to the third category (step 130), and sends the selection to the server (step 131). In response, the server 12 sends to the client 14 the FTP addressing information for the selected code updates (step 132). Using this FTP addressing information, the download routine 39 of the client downloads the code updates from the content server 17 (step 133). In a preferred embodiment, the FTP addressing information for all code updates represented in the selection form are passed with the selection form to the client 14 (in step 124).

As the code updates are being downloaded, the download routine also records status information (such as the FTP addresses) of the code updates in case of interruption to the communication line. If there is such an interruption, the downloading can continue later where it left off. Because the interruption could be lengthy and the system characteristics could have been altered, immediately before the selected code updates are actually installed the update manager 32 invokes the corresponding recognizer programs again to ensure that the code updates are still required; it is possible that changes could have occurred to the client since the recognizer programs were previously executed. If the code updates are still appropriate, the service application routine of client 14 installs the code updates in the client 14 as follows (step 134). For every code update file whose stale version is not currently in use by client 14, the service application routine replaces the stale file with the updated file. The update manager also lists each code update file whose stale version is currently in use. Then, the client is requested to re-boot, and the operating system installs the listed code updates during the re-boot. For all code updates selected by the user that represent one or more bytes of a file, the service application routine replaces just the one or more bytes of the file. For such files that are not currently in use, this occurs without requesting the user to re-boot. For such files that are currently in use, the user is requested to re-boot, and the operating system installs the one or more bytes during the re-boot.

Figure 6:
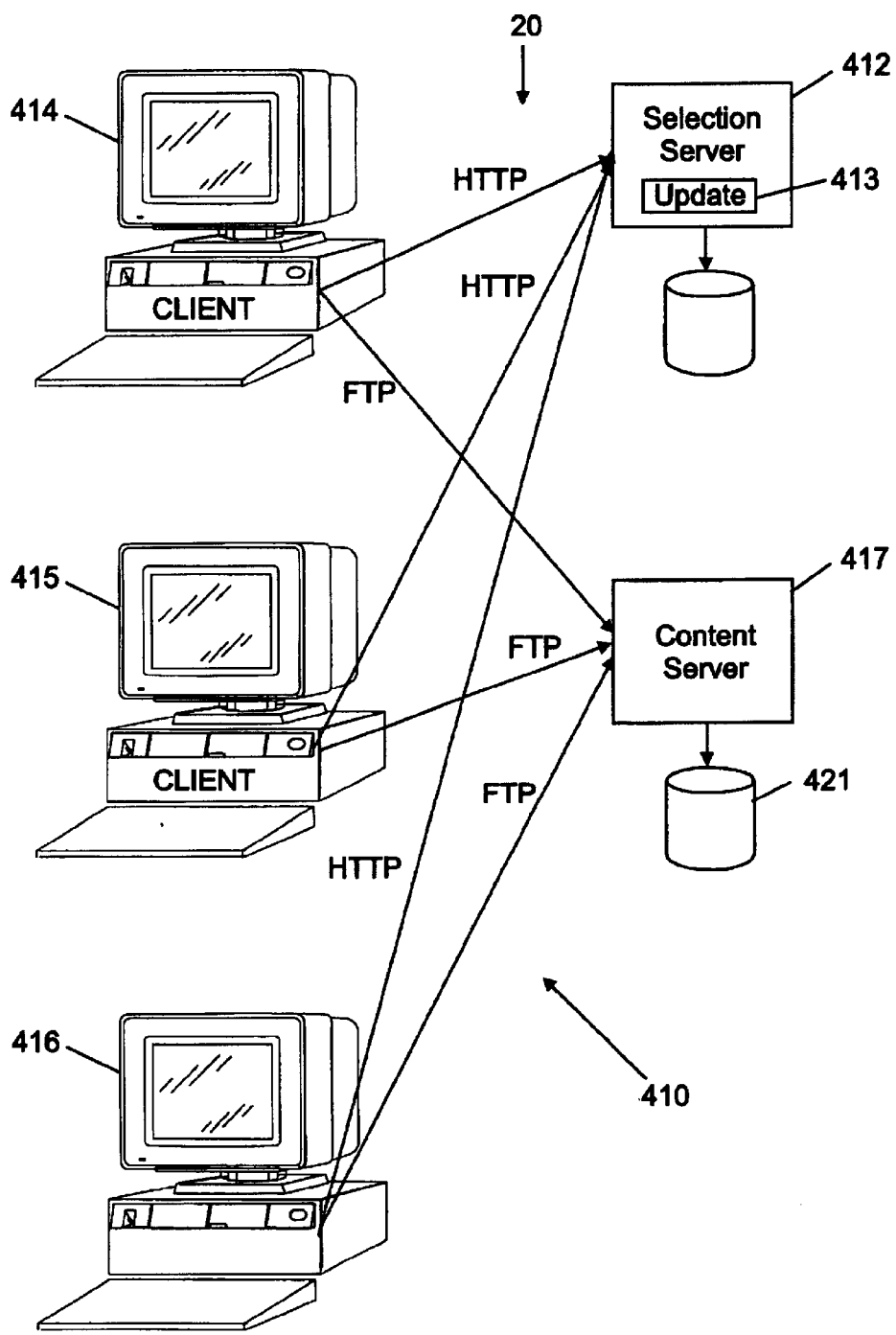
FIG. 6 illustrates another embodiment of a computer network.

FIG. 6 illustrates another embodiment of a computer network generally designated 410. Network 410 comprises a selection server 412 with a data base 413, a content server 417, clients 414–416, and Internet 20 to interconnect the servers and clients. By way of example, the selection server 412 comprises a computer workstation with associated programming and a modem, the content server 417 comprises a computer workstation with associated programming and a modem, and each of the clients 414–416 comprises a personal computer with associated programming and a modem. Communications between the clients and the selection server 412 use hypertext transport protocol (HTTP) and communications between the clients and the content server 417 use file transport protocol (FTP). Although not shown, there are many other servers for the Internet.

Selection server 412 is dedicated to automating selection of data updates and additional data, collectively called "new data." The content server 417 includes the actual, new data (stored on disk 421), and data base 413 includes meta data for the new data and FTP addressing information to locate the new data in content server 417. The meta data provides descriptive information about the respective new data such as those user attributes for which the new data is appropriate (assuming the user does not already have the new data). The FTP addressing information indicates the address or identification of the content server which stores the respective new data (content server 417 in the illustrated example), a user ID and password to log-on to the content server, a name of the new data, a list of files which comprise the new data and the size, checksum, and directory of each file.

According to one process for storing the new data in the content server 417 and the meta data in the selection server 412, a person writes the new data and meta data and loads them into the content server 417, either via the Internet or by manual loading. The new data remains stored in the content server, but the meta data is written to the selection server 412, either via the Internet or by manual loading.

Figure 7:
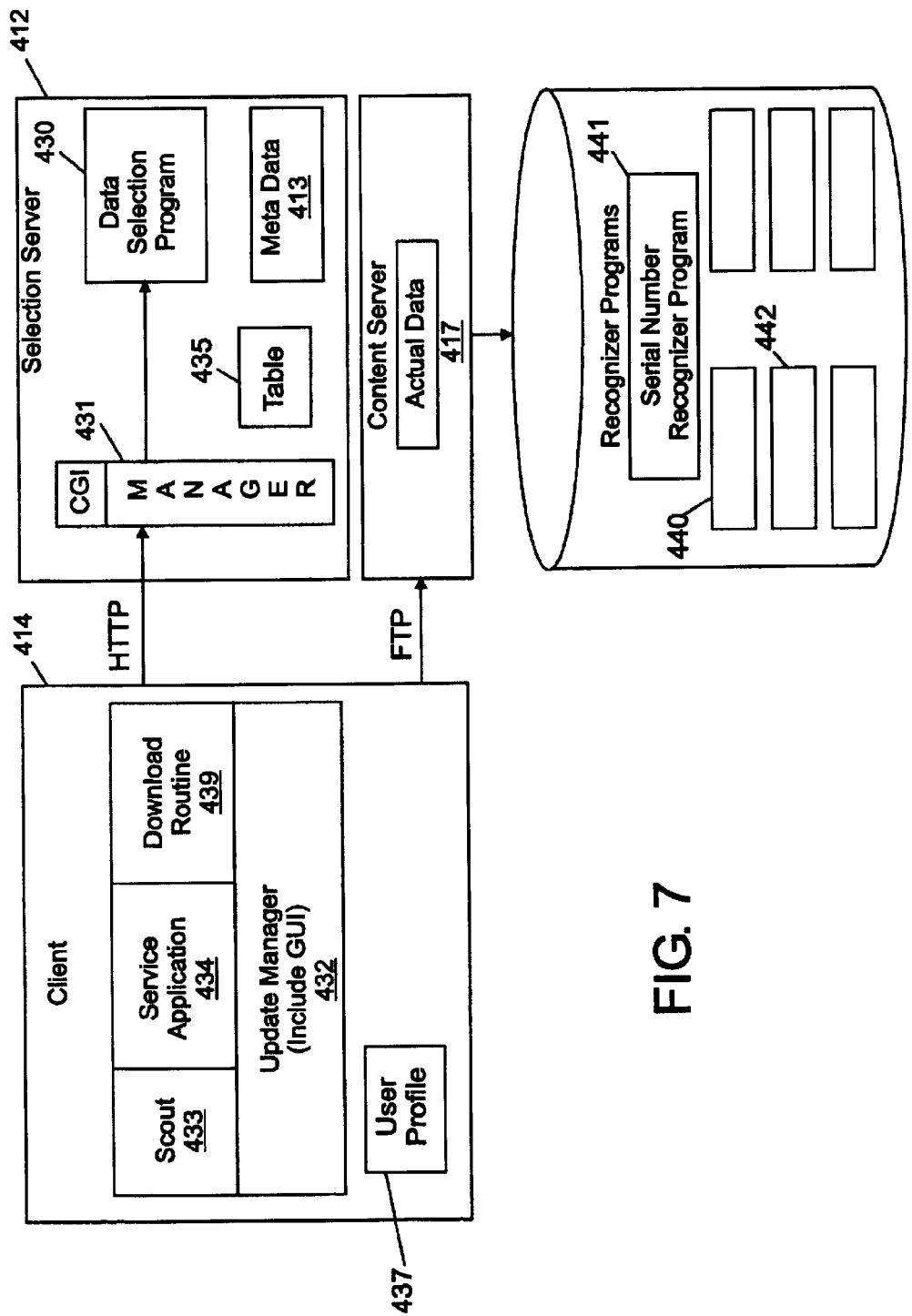
FIG. 7 is a block diagram illustrating more detail of a selection server, content server, and a client in the network of FIG. 6.
Figure 8C:
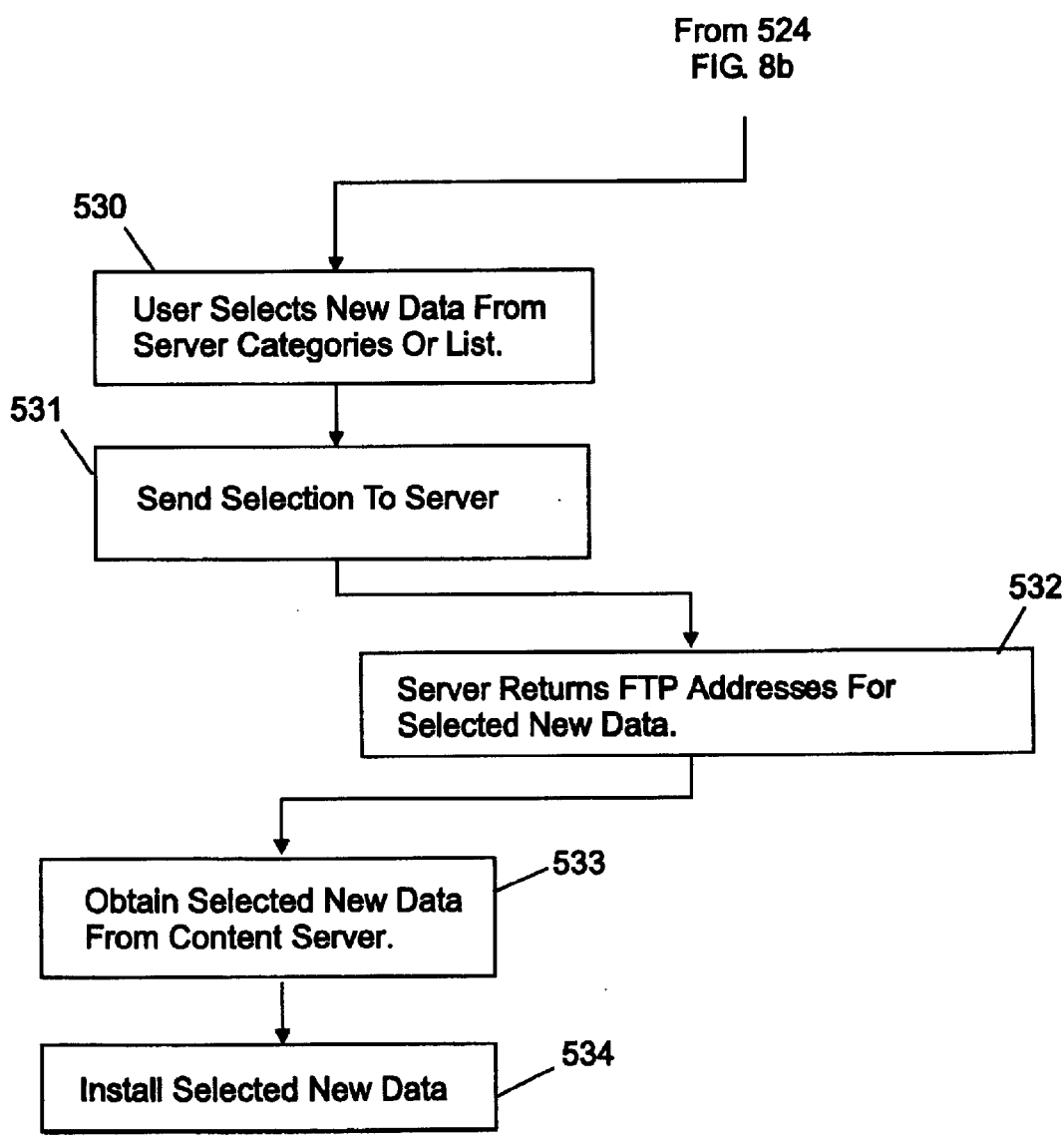
FIGS. 8a and 8b form a flow chart illustrating operation of the client and server of FIG. 7.

As illustrated in FIG. 7, the selection server 412 is an HTTP server with an associated "CGI" program manager 431 and includes a data selection program 430. The client 414 includes an update manager program 432 (including a GUI), a scout routine 433, a service application routine 434, and a download routine 439. The functions of the server and client programming and a typical client-server session for selecting and downloading new data are illustrated in FIGS. 8a and 8b.

A user at client computer 414 selects an icon to invoke update manager 432. In response, the update manager contacts the general manager 431 in server 412 to begin a session and supplies the current level of update manager 432, scout 433, service application 434, and download routine 439 within client 414 (step 504). In response, the general manager 431 determines if the client's update manager 432, scout 433, service application 434, and download routine 439 are the latest version (step 506). This determination is performed by comparing the client level information supplied by the client 414 to the data in selection server 412 for the latest version of the client's update manager 432, scout 433, service application 434, and download routine 439 stored in the content server 417.

If the client's update manager, scout, service application, and download routine are not the latest version, the server sends the FTP addressing information to the client to allow the client to retrieve the latest versions from a content server.

Along with the FTP addressing for the client update manager, scout, service application, and download routine, the server sends FTP addressing information to the client for a serial number recognizer program 441 stored in content server 417 which will query client 414 for the serial number of client 414 (step 507). Next, the client downloads and installs the latest version of the client update manager, scout, service application, and download routine from the content server if the FTP addressing was provided (step 508).

The furnishing of the FTP addressing information for the recognizer program 441 begins the new data selection process. The client next downloads the recognizer program 441 from the content server and executes it (step 509). The recognizer program 441 then obtains the serial number of the client 414 from the basic input output system (BIOS) firmware, using scout APIs (step 509). The update manager routine 432 then sends the serial number of the client 414, obtained by the recognizer program 441, to the selection server 412 (step 510).

This initiates the selection update program 430 (step 512). The selection update program 430 within server 412 then determines, from a table 435, the employee number or name of the user that owns the machine comprising client 414. Alternately, when there is more than one user of client 414, the users send their names or serial numbers to the server 412 (in step 510). In this scenario, selection server 412 does not send the FTP of recognizer program 441 to client 414 in step 507 and client 414 does not fetch or execute recognizer program 441. There is no need.

Once selection server 412 knows the employee number or name of the user of client 414, either from recognizer program 441 and table 435 or directly from the user, the selection update program can determine which data is appropriate for the user and which data is not appropriate for the user. This eliminates the vast majority of the data stored in content server 417 (and other content servers, if any) from further consideration (step 514). In the illustrated embodiment, this determination is made by having the selection update program first read from table 435 the user attributes corresponding to the user's serial number or name. These user attributes may include the user's job title, department, profession, age, income, or interests previously expressed by the user and forwarded to the server. Then, the selection update program correlates the meta data in data base 413 to the user's attributes. Matches between the meta data and the user's serial number or other attributes indicate that the corresponding new data may be appropriate for client 414. In practice, the meta data and table 435 can be arranged in a relational data base to facilitate the correlation function.

For example, the following table lists data available in content server 417 and the user attributes-meta data that matches each of the new data.

| New Data | User Attributes-Meta Data |
| --- | --- |
| Customer List | Marketing person |
| Price List | Marketing person |
| Salary Chart | Manager |
| Company Rules | All Employees |
| Golf Ad #1 (news) | Golfer |
| Golf Ad #2 (equipment) | Golfer |
| Bowling Ad #1 | Bowler |
| Bowling Ad #2 | Bowler |

In this example, users who are marketing employees are entitled to receive only "Customer List," "Price List," and "Company Rules" data. Users who are management employees are entitled to receive only "Salary Chart" and "Company Rules" data. Users who are golfers, but not employees, are targeted to receive only "Golf Ad #1" and "Golf Ad #2" data. Users who are bowlers, but not employees, are targeted to receive only "Bowling Ad #1" and "Bowling Ad #2" data.

For each new data which is consistent with the user's attribute(s), the selection update program 430 sends to the client 414 the FTP addressing information of a corresponding recognizer program and the corresponding meta data (step 516). For example, for a user having the attribute of golfer, the selection update program 430 sends the FTP addressing for recognizer programs 440 and 442, respectively for "Golf Ad #1" and "Golf Ad #2." The FTP addressing information is not provided to client 414, however, for the recognizer programs for the other new data which is not consistent with the user's attribute(s). From the FTP addressing information, the client 414 downloads the actual recognizer programs from the content server 417 (step 518).

Each recognizer program is executable and small, typically 2,000–3,000 bytes. Consequently, each recognizer program can be downloaded from content server 417 to the client 414 in seconds (whereas the corresponding new data may be much larger and take minutes or even hours to download).

It should be noted that, based on the user attribute(s) alone, the selection update program 430 within server 412 is not sure which of the new data that is consistent with the user's attribute(s) is actually needed by the client. For example, the client may already have some or all of the new data.

Next, the client 414 executes recognizer programs 440 and 442 with assistance from the scout 433 (step 518). The scout 433 assists the recognizer programs by providing subroutines that can be called by the recognizer programs. For files required by the recognizer programs, these callable subroutines can locate the files, determine the version of the files, determine the length of the file, identify a directory which lists the files, obtain time stamps for the files, obtain data from inside the files, and obtain data from a program registry. This further reduces the requisite length of each recognizer program and therefore shortens the download time. When executed, each recognizer program further investigates storage of the client computer 414 to determine if the user already has the new data available from the client computer. Optionally, the recognizer program may investigate a user profile 437 stored in the client computer 414 to determine whether the new data is consistent with other user attributes stored in user profile 437.

Figure 9:
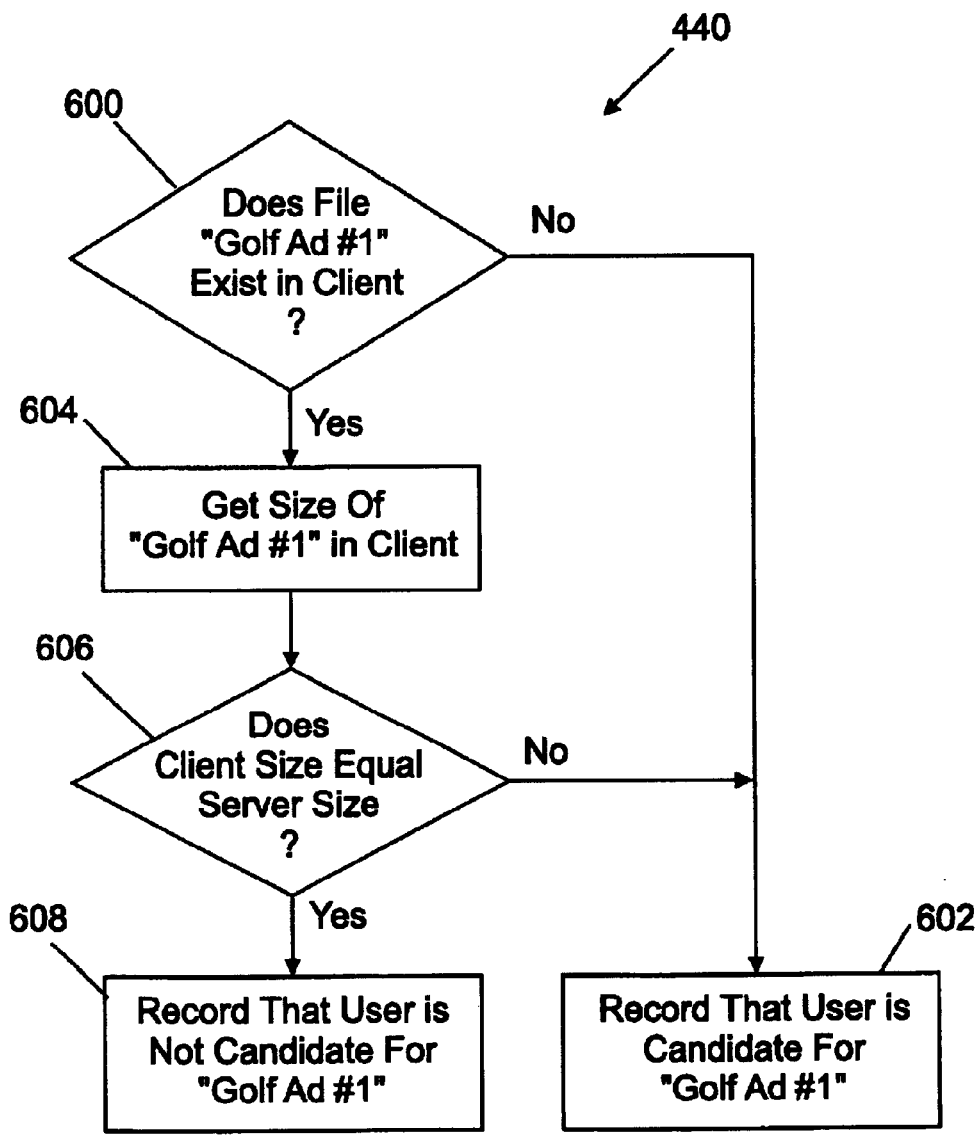
FIG. 9 is a flow chart illustrating a program sent from the server to the client of FIG. 7 to determine needs of the client for a particular set of new data.

Recognizer program 440 is illustrated in more detail in FIG. 9 and investigates the user's storage as follows. In this example, the sole user attribute (stored in table 435 in the selection server 412) is "golfer." First, recognizer program 440 determines from the scout routine 433 in client 414 if client 414 already has a copy of the Golf Ad #1 available for the user (decision 600). If not, then recognizer program 440 determines that, so far, "Golf Ad #1" is deemed appropriate for the user (step 602). If client 414 stores a file called "Golf Ad #1," however, then recognizer program 440 optionally will check if this is the same file as the one currently stored on the server with the same name. Accordingly, recognizer program 440 compares the size of the "Golf Ad #1" file stored in client computer 414 to the size of the "Golf Ad #1" file stored in the content server 417 (step 604 and decision 606). (The size of Golf Ad #1 stored in content server 417 was included in the meta data that was sent along with the FTP address of the recognizer program.) If the sizes are different, then recognizer program 440 concludes that they are different files and that this file is deemed appropriate for downloading from the content server to the client computer 414 (step 602). If the sizes are the same, then recognizer program 440 concludes that they are the same file, and another copy of "Golf Ad #1" is not appropriate for downloading to the client computer (step 608). Recognizer program 442 performs the same analysis for "Golf Ad #2."

For new data that are lengthy, a respective recognizer program could also determine if the client computer has sufficient memory for the new data by using the appropriate scout function. A recognizer program could also compare the meta data for new data to user profile 437 maintained in client computer 414 to further determine whether the new data is appropriate for the user. For example, the user profile 437 may qualify that the user's interests in golf are limited to golf news but not golf equipment. In such a case, the recognizer program would determine that "Golf Ad #1" relating to "news" would be appropriate for the user but "Golf Ad #2" relating to "equipment" would not be appropriate for the user.

Figure 10:
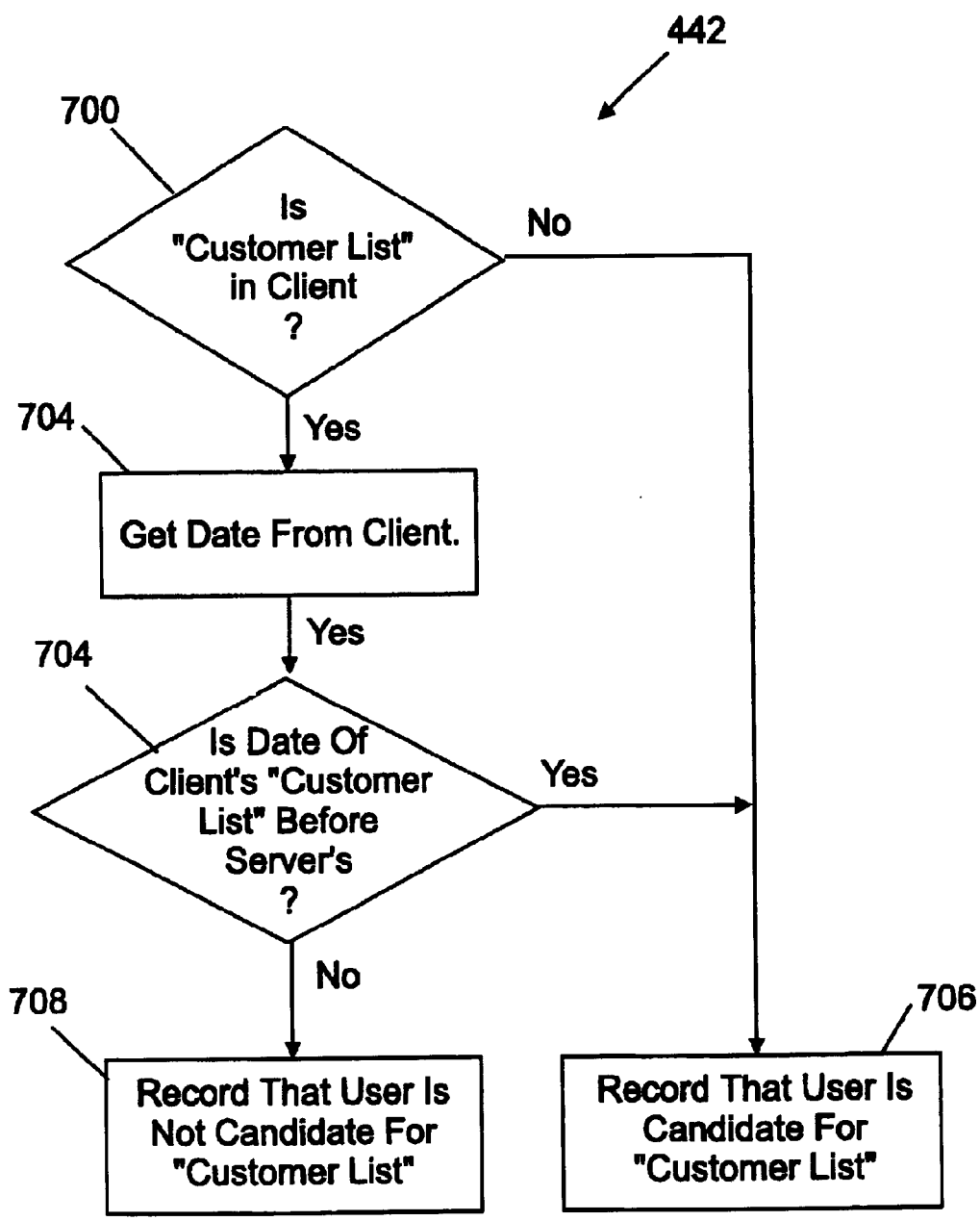
FIG. 10 is another flow chart illustrating a program sent from the server to the client of FIG. 7 to determine needs of the client for another particular set of new data.

Assume that another recognizer program 442 illustrated in FIG. 10 corresponds to the "Customer List" data Recognizer program 442, when executing in client computer 414, will determine if the user already has a file called "Customer List" (decision 700). If not, then the recognizer program 442 determines that this data is appropriate for downloading to the client (step 706). If the client already has a file called "Customer List," however, then recognizer program 442 will compare (step 704) the date associated with the creation of the "Customer List" file stored in the server (and fetched with recognizer program 442) to the date associated with the creation of the "Customer List" file stored in client 414 (and obtained in step 702). If the date stored in the server is later, then the "Customer List" data stored in the server is appropriate for the user (step 706). Otherwise, it is not appropriate for the user (step 708).

The results of the recognizer programs include yes/no answers to the question of whether each respective new data is appropriate for the user, i.e., not currently available in client 414 for the user and, optionally, consistent with the user's profile, if any, stored in table 435 in the client computer. (The selection update program previously determined that the new data were consistent with the user's attributes stored in table 435 in the server computer.) The recognizer programs can also assign a "critical" level to each new data based on the need of the user for the new data. For example, if the data are especially important such as the "Customer List" or the "Salary Chart," and the user has no version or a very old version, then this data would be assigned a high level of criticality. After the recognizer programs are executed in client 414, client 414 sends to selection server 412 a list of the new data which is appropriate for the user (step 520 ).

Based on the information gathered by the recognizer programs, the selection update program determines the level of criticality of the respective new data and builds a selection form for display at the client (step 522). The selection form comprises a list of the new data that is consistent with the user's attributes and appropriate for the client 414, and a display of the following three selection choices (step 524):

1. critical data (to minimize the download time);
2. all new data that are appropriate for the user; and
3. client selection of appropriate new data—user selects particular new data from the list of all new data which are appropriate for the user.

Next, the user makes a selection, either selection of the first or second categories or an itemized list of new data pursuant to the third category (step 530), and sends the selection to the server (step 531). In response, the server 412 sends to the client 414 the FTP addressing information for the selected new data (step 532). Using this FTP addressing information, the download routine 439 of the client downloads the new data from the content server 417 (step 533). In a preferred embodiment, the FTP addressing information for all new data represented in the selection form are passed with the selection form to the client 414 (in step 524).

As the new data are being downloaded, the download routine also records status information (such as the FTP addresses) of the new data in case of interruption to the communication line. If there is such an interruption, the downloading can continue later where it left off. Upon completion of the download, the service application routine of client 414 installs the new data in the client 414 for access by the user as follows (step 534). For all files constituting the new data, except those which represent updates to existing data stored in the client computer for which the stale version is currently in use by client 414, the service application routine replaces the existing files in client 414 with the new file. The update manager also lists each data file whose stale version is currently in use. Then, the user is requested to re-boot, and the operating system installs the listed data during the re-boot. For all appropriate new data selected by the user that represents one or more bytes of a file, the service application routine replaces just the one or more bytes of the file. For such files that are not currently in use, this occurs without requesting the user to re-boot. For such files that are currently in use, the user is requested to re-boot, and the operating system installs the one or more bytes during the re-boot.

Techniques for selecting and transferring code updates and new data to a client computer have been disclosed. Numerous modifications and substitutions can be made, however, without deviating from the scope of the present invention. For example, there can be multiple content servers, or the selection server functions and content server function can be merged into one server. If desired, protocols other than HTTP and FTP can be used. Further, a three-tiered architecture for determining whether to provide a software update may be implemented.

Figure 11:
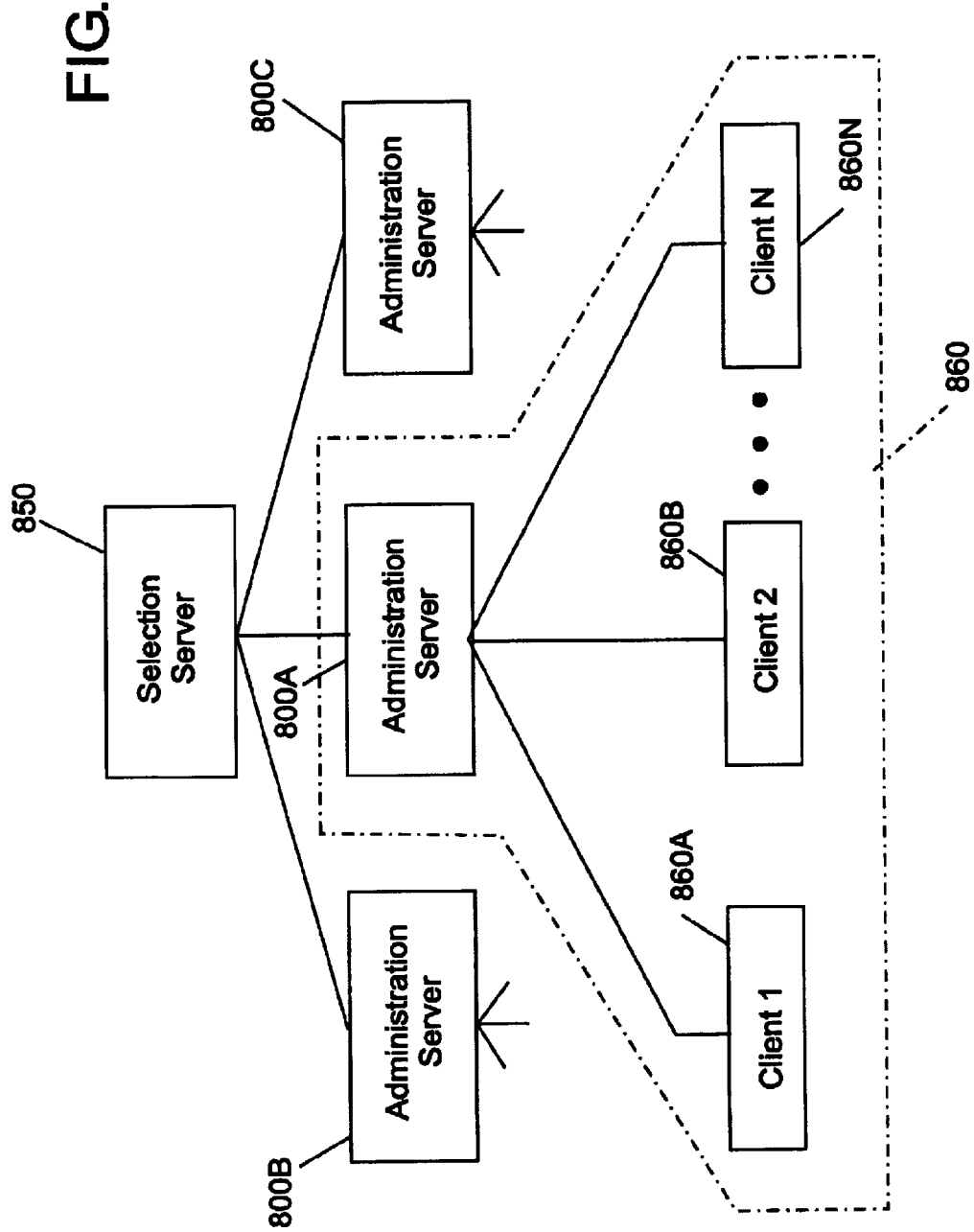
FIG. 11 is a block diagram of an exemplary system in accordance with the present invention.

FIGS. 11 and 12 are block diagrams showing another exemplary embodiment of a system and method in accordance with the present invention. The present invention determines whether to provide a software program update 820 (or a new software program) to one of a plurality of client processors 860A–860N, each client processor 860A–860N requiring one of a plurality of software program updates. FIG. 11 shows an exemplary system in accordance with this embodiment of the invention.

The embodiment includes a three-tiered architecture for determining the need for, and controlling the application or removal (installation and uninstallation) of, computer readable binary data (referred to as "updates") from a centrally administered location. The third (or highest) tier includes a selection server processor 850 (which may also be the content server providing mass storage for software and data). The second (or middle) tier includes an administration server processor 800A which may include a GUI. Administration server processor 800A communicates with selection server processor 850 on behalf of the client processors 860A–860N, the first (or bottom) tier processors. The administration server processor 800A controls which updates are installed and uninstalled on the client processors 860A–860N. The client processors 860A–860N each include a "client agent," a program executed by each client processor which accepts commands from administration server processor 800A, processes the commands, and returns status information 870, 871 (described in detail below) to administration server processor 800A.

In the exemplary system, at least one selection server processor 850 provides a source of software program updates 820 for client software programs and system configuration management tools, which are described in detail below. The selection server processor 850 may be, for example, an enterprise server which serves an entire business or university, or a division or subset of a larger entity. Alternatively, the selection server processor 850 may be a server processor for a software vendor; a plurality of administration server processors 860A–860N may communicate with the selection server processor 850 via a worldwide telecommunications network, such as the Internet.

At least one administration server processor 800A is provided. Administration server processor 800A provides the tools and resources for managing the system configuration in the client processors 860A–860N served by administration server processor 800A. The administration server processor 800A and client processors 860A–860N may, for example, all be connected in a local area network (LAN) 860 within an office, a floor of a building, or a local campus. On the other hand, the administration server may serve a plurality of client processors that are related by business function; the client processors 860A–860N and administrative server processor 800A need not all be co-located.

The administration server processor 800A and its GUI have the following general features:

1) The ability to logically group multiple first-tier client processors in user definable groups.

2) The ability to log (track) activity corresponding to each first-tier client processor.

3) The ability to perform the "update discovery" task for groups or single first-tier client processors.

4) The ability to perform the "update apply" task for sets of updates onto groups or single first-tier client processors.

5) The ability to perform the "update remove" task for sets of updates from groups or single first-tier client processors.

6) The ability to schedule the "update discovery," "update apply," and "update remove" tasks to occur at any given time and frequency.

7) The ability to view which updates are potentially applicable to each individual client processor or group of client processors.

8) The ability to view which client processors are in need of which updates or a group of updates.

Although FIG. 11 only shows a single LAN 860, each of the other administration server processors 800B and 800C has one or more client processors (not shown). The description of exemplary administration server processor 800A and client processors 860A–860N also applies to administration server processors 800B and 800C and their respective client processors (not shown).

FIG. 12 shows in greater detail the pertinent processes and data flows within the exemplary system. In particular, the functions and data flows of administration server processor 800A are emphasized in FIG. 12.

The administration server processor 800A includes three major tasks described below: the "update discovery," "update apply," and "update remove" tasks. Within the administration server processor 800A, the "update discovery" task includes blocks 810–816. The "update apply" task includes blocks 817 and 818. The "update remove" task is not shown in FIG. 12. The blocks 810–818 within administration server processor 800A include both general purpose computer hardware and software program instructions in administration server processor 800A, including conventional intra-processor and inter-processor communications functions.

Update Discovery

The "update discovery" task is defined as the administration server process of determining the applicability of (or need for) a set of updates 820 on a group of (or single) client processors 860A–860N. This process consists of communicating to selection server processor 850 in order to identify the administration server processor 800A and its level and type. This communication may be performed, for example, by using HTTP.

The selection server processor 850 returns meta data (which may be HTTP links) directing or pointing the administration server processor 800A to download a "system recognizer" program 851. The administration server processor 800A downloads (for example, via FTP) the system recognizer program 851 from the selection server processor 850.

The system recognizer program 851 is provided by selection server processor 850 to a system recognizer receiving means 810 in administration server processor 800A. System recognizer transmitting means 811 transmits the system recognizer program 851 to the client processor 860A. At block 862, the client processor 860A executes the system recognizer program 851 to determine the system configuration attributes.

The administration server processor 800A communicates a command and meta data (via HTTP) to each client processor 860A–860N, as directed by the system administrator (user) from the GUI of the administration server processor 800A. This command and meta data cause each affected client processor 860A–860N to download (via HTTP) the system recognizer program 851 and execute it. The system recognizer program 851 is responsible for determining a set of hardware and/or software attributes for each client processor 860A–860N that executes the system recognizer program 851. The system recognizer program 851 in each client processor 860A–860N then returns the results (in the form of a set of system configuration attributes 870) to the administration server processor 800A.

Administration server processor 800A includes configuration receiving means 812 for receiving and storing a respective set of system configuration attributes 870 from each one of the plurality of client processors 860A–860N. The system configuration attributes 870 indicate whether a copy of any of the client software programs may be stored in the respective client processor 860A–860N. Administration server processor 800A also includes configuration transmitting means 813 for transmitting each set of system configuration attributes 870 to selection server processor 850.

This high-level identification of the configuration of each client processor may be performed at the time the system is set up, or infrequently thereafter. The high-level identification using the system recognizer program 851 need not be repeated every time the "update discovery" task is performed. Optionally, the system recognizer program 851 may be repeated every time the "update discovery" task is performed.

The selection server processor 850 then returns, to the update receiving means 814 of administration server processor 800A, meta data describing all the potential updates stored in selection server processor 850 that may apply to any client processor 860A–860N with the attributes 870 which have been transmitted to selection server 850. The meta data include information directing (pointing) to an "update recognizes" program 852 for each identified potential update 820. The update receiving means 814 of administration server processor 800A then downloads software 853, including the updates 820 and update recognizer program 852 (via FTP), from the selection server processor 850 to the administration server processor 800A. The update receiving means 814 receives a respectively different update recognizer program 852 and software program update 820 from the selection server processor 850 corresponding to each respective one of the plurality of client software programs.

An update recognizer transmitting means 815 transmits to each client processor 860A–160N the update recognizer program 852 corresponding to the respective client software programs in each respective client processor 860A–160N. Each client processor (e.g., 860A) executes at least one of the update recognizer programs in block 864 to issue a notification 871 to administration server processor 800A. The notification 871 indicates whether the corresponding software program update 820 is applicable to the copy of the respective client software program in that client processor 860A. In the exemplary embodiment, the administration server processor 800A communicates a command and meta data (via HTTP) to each client processor 860A with the corresponding system attributes. The command and meta data cause each affected client processor 860A to download (via HTTP) the update recognizer 852, execute it, and return the results to the administration server processor 800A.

As described above, the system recognizer program 851 provides high level information about the hardware and/or software configuration of a client processor 860A sufficient for a coarse level determination of which updates may potentially be applicable to a given client processor 860A The update recognizer 852 is responsible for determining the actual applicability (need) of the specific update to the specific client processor 860A with a fine degree of specificity.

For example, the system recognizer 851 may identify which programs reside in each client processor. The update recognizer program 852 would identify the specific level (version, release, and/or maintenance level) of the copy of the program in the client processor 860A. The update recognizer 852 would determine whether a specific update should be installed based on the actual level of the copy of the program in the client processor 860A.

The update recognizer program 852 is a relatively short agent program which can make very specific decisions about which updates should be applied to an individual client processor system 860A. This provides a fine level of granularity in configuration management, by allowing the updates themselves to decide whether they apply to the system. The small update recognizer program that comprises the agent for the update may be written by the update author, or by another similarly qualified expert knowledgeable of the criteria for determining which update should be installed in which systems.

Administration server processor 800A includes notification receiving means 816 for receiving and storing the respective notification 871 from each client processor 860A–860N. After the update recognizers are run on all affected client processors 860A–860N, the resulting information may be stored by the administration server processor 800A. The administration server processor 800A then displays via its GUI which updates are applicable to which client processor 860A or group of clients.

Update Apply

The "update apply" task is defined as the administration server process of installing a set of updates 820 onto a client processor 860A or group of clients 860A–860N. A selecting means 817 is provided for selecting one of the plurality of software programs and one of the plurality of clients. The administration server GUI provides a selecting means 817 to select (choose) which updates are to be applied to which client 860A or group of clients 860A–860N. When the "update apply" process is invoked for a set of client processors 860A–860N, only those updates which are selected (chosen) by the operator are actually installed.

The selecting means 817 may use an additional, user-defined criterion other than a hardware configuration or software configuration of the plurality of client processors 860A–860N to perform the selecting. For example, the selection server processor 850 may have one hundred updates. Based on the configuration attributes for the client processors on a given LAN, only ten of the one hundred updates may be potentially applicable for the client processors of the LAN. Further, execution of the update recognizer programs associated with these ten updates may result in identification of only six updates that should specifically be installed on the LAN. (For example, the client processor may already have a higher release level for the remaining four.) Of these six applicable updates, the system administrator (operator) may choose to install only two updates on a given occasion, for business reasons unrelated to the system configuration of the client processors. For example, updates may be delayed for budgetary reasons, or for the convenience of a specific business group or department of client processor users.

One of ordinary skill in the art recognizes that business-related criteria for deciding when to update software (which are independent of the hardware and software configuration criteria) may be included in the selecting means 817 of the administration server processor software. For example, the selecting means 817 may include program code to: (1) categorize all the client processors 860A–860N by business group or function; (2) coordinate the schedules of the users of the various client processors 860A–860N; and (3) select a time for installing updates 820, so as to minimize disruption of user activity.

Once the selection is made, an update transmitting means 818 is responsive to the selecting means 817 for transmitting a software program update 820 associated with the selected software program to the selected client processor 860A. The administration server processor 800A downloads (for example, via FTP) all of the necessary components (files) from the content server (i.e., selection server 850) for each update 820 that is to be applied. The components that are to be downloaded to administration server processor 800A are extracted from the meta data received from the selection server 850 during the "update discovery" process, described above.

After downloading the updates 820 to the administration server processor 800A, the update transmitting means 818 transmits the update 820 to the selected client processors 860A–860N in which the updates 820 are to be installed. To accomplish this, the administration server processor 800A sends a command and meta data to each selected client processor 860A–860N for each update 820 that is to be applied. The command causes the recipient client processor 860A to download (e.g., via HTTP) the necessary components (files) and execute the respective "update installer" for each component, to appropriately install the update 820. Upon completion, a status message (not shown) is sent from the client processor 860A to the administration server processor 800A.

After the status message is received by administration server processor 800A, indicating installation on a client processor 860A, administration server processor 800A updates its configuration data to indicate that the update 820 is no longer available for installation in that client processor 860A, and that the update is now available for removal (uninstall). In some cases, of course, the update may not be removable.

Update Remove

The "update remove" task (not shown) is defined as the administration server processor 800A process of uninstalling a set of updates 820 from a client processor 860A or group of clients in a manner analogous to the "update apply" task described above. In the case of the "update remove" task, the command and corresponding action uninstalls the update. After removal from a client processor 860A, the update 820 is no longer available for removal, but is again available for installation.

Other Embodiments and Variations

In the exemplary embodiment, the selection server processor 850 is also described as being the content server for mass storage of software and data. One of ordinary skill in the art recognizes that a selection server processor according to the invention may also be instantiated in a separate and distinct processor from the content server processor. In this variation, the selection server would transmit meta data (including pointers) to the administration server processor 800A. The meta data would direct the administration server processor 800A to the location of files in the content server processor.

In the exemplary embodiment, the administration server processor 800A employs a GUI for ease of use. One of ordinary skill in the art recognizes that an administration server processor according to the invention may also use a text base user interface.

Further, the invention may also be embodied in the form of program code embodied in tangible media, such as random-access memory (RAM), read-only memory (ROM), floppy diskettes, CD-ROMs, hard disk drives, zip drives, or any other machine-readable storage medium, wherein, when the program code is loaded into and executed by a machine, such as a computer, the computer becomes an apparatus for practicing the invention. The invention may also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. An administration server for determining whether to provide a software program update to a processor group, the processor group including a plurality of client processors, said administration server comprising:

configuration receiving means for receiving and storing a set of system configuration attributes from the processor group, the system configuration attributes indicating whether a copy of a client software program may be applicable to the processor group;

configuration transmitting means for transmitting the set of system configuration attributes to a selection server;

update receiving means for receiving an update recognizer program from the selection server, the update recognizer program being associated with the client software program and executed at the processor group to determine if an update is applied; and update recognizer transmitting means for transmitting the update recognizer program to the processor group, wherein the processor group executes the update recognizer program to issue a notification indicating whether a software program update is applicable to the copy of the client software program in the processor group.

2. The administration server according to claim 1, further comprising:

notification receiving means for receiving the notification from the processor group; and update transmitting means responsive to the notification for transmitting the software program update to the processor group if the software program update is applicable to the copy of the client software program in the processor group.

3. The administration server according to claim 1, further comprising system recognizer transmitting means for transmitting a system recognizer program to the processor group, wherein the processor group executes the system recognizer program to determine the system configuration attributes.

4. An administration server for determining whether to provide a software program update to a processor group, the processor group including a plurality of client processors, each client processor of the plurality of client processors having a copy of at least one of a plurality of client software programs, said administration server comprising:

configuration receiving means for receiving and storing a respective set of system configuration attributes from each one of the plurality of client processors of the processor group, the system configuration attributes indicating whether a copy of any of the client software programs may be applicable to the processor group;

configuration transmitting means for transmitting each set of system configuration attributes to a selection server;

update receiving means for receiving a respective update recognizer program from the selection server corresponding to each respective one of the plurality of client software programs and the update recognizer program being executed at each one of the plurality of client processors to determine if an update is applied; and update recognizer transmitting means for transmitting to each client processor of the processor group the update recognizer program corresponding to the at least one client software program in that processor, wherein each client processor of the processor group executes at least one of the update recognizer programs to issue a notification indicating whether a corresponding software program update is applicable to the copy of the at least one client software program in that client processor.

5. The administration server according to claim 4, further comprising:

notification receiving means for receiving the respective notification from each client processor of the processor group; and update transmitting means responsive to the notifications for transmitting the software program update to at least one of the client processors of the processor group for which the software program update is applicable.

6. The administration server according to claim 5, further comprising:

selecting means for selecting at least one of the plurality of software programs and at least one of the plurality of client processors of the processor group, the update transmitting means being responsive to the selecting means for transmitting a software program update associated with each selected software program to each selected client processor.

7. The administration server according to claim 6, wherein the selecting means utilizes an additional user-defined criterion other than a hardware configuration or software configuration of the plurality of client processors to perform the selecting.

8. The administration server according to claim 4, further comprising system recognizer transmitting means for transmitting a system recognizer program to each of the plurality of client processors of the processor group, wherein each client processor of the processor group executes the system recognizer program to determine the respective system configuration attributes.

9. In a system having a processor group and first and second server processors, a method of updating software in the processor group, comprising the steps of:

storing in the first server processor a set of system configuration attributes from the processor group, the system configuration attributes indicating whether a copy of a client software program may be applicable to the processor group;

transmitting the set of system configuration attributes from the first server processor to the second server processor;

transmitting an update recognizer program from the second server processor to the first server processor, the update recognizer program being associated with the client software program;

transmitting the update recognizer program from the first server processor to the processor group; and executing the update recognizer program in the processor group in order to issue a notification indicating whether a software program update is applicable to the copy of the client software program in the processor group.

10. The method according to claim 9, further comprising the steps of:

transmitting the notification from the processor group to the first server processor; and transmitting the software program update from the first server to the processor group if the software program update is applicable to the copy of the client software program in the processor group.

11. The method according to claim 10, wherein the processor group includes a plurality of client processors, each adapted to have a copy of at least one of a plurality of software programs, for which a plurality of software program updates are transmitted from the second server processor to the first server processor, further comprising the steps of:

transmitting notifications from the plurality of client processors to the first server processor, each notification indicating whether one of the software program updates is applicable to the corresponding client processor;

selecting one of the plurality of software programs and one of the plurality of clients; and transmitting a software program update associated with the selected software program from the first server processor to the selected client processor.

12. A computer-readable medium for use in an administration server processor for determining whether to provide a software program update to a processor group, the processor group including a plurality of client processors, the computer readable medium comprising:

means for causing the administration server processor to receive and store a set of system configuration attributes from the processor group, the system configuration attributes indicating whether a copy of a client software program may be applicable to the processor group;

means for causing the administration server processor to transmit the set of system configuration attributes to a selection server processor;

means for causing the administration server processor to receive an update recognizer program from the selection server processor, the update recognizer program being associated with the client software program; and means for causing the administration server processor to transmit the update recognizer program to the processor group, wherein the processor group executes the update recognizer program to issue a notification indicating whether a software program update is applicable to the copy of the client software program in the processor group.

13. The computer-readable medium according to claim 12, further comprising:

means for causing the administration server processor to receive the notification from the processor group; and means for causing the administration server processor to respond to the notification by transmitting the software program update to the processor group if the software program update is applicable to the copy of the client software program in the processor group.

14. The computer-readable medium according to claim 12, further comprising means for causing the administration server processor to transmit a system recognizer program to the processor group, wherein the processor group executes the system recognizer program to determine the system configuration attributes.

15. A three-tiered configuration management system comprising:

a third tier comprising a selection server;

a first tier comprising a processor group having a plurality of client processors; and a second tier comprising an administration server for determining whether to provide a software program update to said processor group, said administration server comprising:

configuration receiving means for receiving and storing a set of system configuration attributes from the processor group, the system configuration attributes indicating whether a copy of a client software program may be applicable to the processor group;

configuration transmitting means for transmitting the set of system configuration attributes to a selection server;

update receiving means for receiving an update recognizer program from the selection server, the update recognizer program being associated with the client software program; and update recognizer transmitting means for transmitting the update recognizer program to the processor group, wherein the processor group executes the update recognizer program to issue a notification indicating whether a software program update is applicable to the copy of the client software program in the processor group.

* * * * *